United States Patent
Gursha et al.

(10) Patent No.: US 12,130,883 B2
(45) Date of Patent: Oct. 29, 2024

(54) SYSTEMS AND METHODS FOR FOLDER-BASED CONTENT CONVERSION

(71) Applicant: Cactus Block LLC, Syracuse, NY (US)

(72) Inventors: Michael Gursha, Chappaqua, NY (US); Douglas Gursha, Chappaqua, NY (US)

(73) Assignee: CACTUS BLOCK LLC, Syracuse, NY (US)

( * ) Notice: Subject to any disclaimer, the term of this patent is extended or adjusted under 35 U.S.C. 154(b) by 0 days.

(21) Appl. No.: 18/298,321

(22) Filed: Apr. 10, 2023

(65) Prior Publication Data

US 2023/0325458 A1 Oct. 12, 2023

Related U.S. Application Data

(60) Provisional application No. 63/362,807, filed on Apr. 11, 2022.

(51) Int. Cl.
*G06F 17/00* (2019.01)
*G06F 16/11* (2019.01)
*G06F 16/16* (2019.01)
*G06F 16/951* (2019.01)
*G06F 16/958* (2019.01)

(52) U.S. Cl.
CPC .......... *G06F 16/958* (2019.01); *G06F 16/116* (2019.01); *G06F 16/168* (2019.01); *G06F 16/951* (2019.01)

(58) Field of Classification Search
CPC .... G06F 16/958; G06F 16/116; G06F 16/168; G06F 16/951; G06F 16/13; G06F 16/14
See application file for complete search history.

(56) References Cited

U.S. PATENT DOCUMENTS

| | | | |
|---|---|---|---|
| 7,747,941 B2 | 6/2010 | Campbell et al. | |
| 8,515,941 B1 | 8/2013 | Avritch et al. | |
| 9,122,664 B2 | 9/2015 | Zhang et al. | |
| 9,396,173 B2 | 7/2016 | Tymoshenko et al. | |
| 9,448,776 B1 * | 9/2016 | Sankaran | G06F 16/957 |
| 9,516,089 B1 | 12/2016 | Ansel et al. | |
| 9,805,042 B1 * | 10/2017 | Meyer | G06F 16/16 |
| 9,864,812 B2 | 1/2018 | Rochelle et al. | |
| 10,108,806 B2 * | 10/2018 | Zhang | G06F 21/604 |
| 10,318,490 B2 * | 6/2019 | Duggal | G06F 16/178 |

(Continued)

FOREIGN PATENT DOCUMENTS

| | | | | |
|---|---|---|---|---|
| CN | 102722507 A | * | 10/2012 | ........... G06F 16/958 |
| WO | WO-2023244491 A1 | * | 12/2023 | ........... G06F 11/1417 |

OTHER PUBLICATIONS

Kaltman, Eric, et al., "Organizing a Content Profile for a Large, Heterogeneous Collection of Interactive Projects", 2021 IEEE International Conference on Big Data (Big Data), Digital Object Identifier: 10.1109/BigData52589.2021.9671904, Dec. 15, 2021, pp. 1-9. (Year: 2021).*

*Primary Examiner* — Laurie A Ries
(74) *Attorney, Agent, or Firm* — McCoy Russell LLP

(57) ABSTRACT

Systems and methods are provided for a folder-based content management system and method. In one example, a method for the folder-based content management system includes converting an existing infrastructure into editable assets and organizing the editable assets into a structure of a folder file system by recombining the editable assets into a new format. The folder file system may be rendered with the new format as a graphical user interface (GUI).

19 Claims, 20 Drawing Sheets

(56) References Cited

U.S. PATENT DOCUMENTS

| | | | |
|---|---|---|---|
| 10,394,794 B2* | 8/2019 | Raghavan | G06F 16/1873 |
| 10,445,377 B2 | 10/2019 | Berk et al. | |
| 10,452,740 B2* | 10/2019 | Leblond | G06F 16/972 |
| 10,798,156 B2* | 10/2020 | Hanifen | G06F 16/955 |
| 10,824,401 B2 | 11/2020 | Ganesh et al. | |
| 11,461,272 B2* | 10/2022 | Berman | H04L 67/06 |
| 11,955,116 B2* | 4/2024 | Miller | H04N 21/234363 |
| 2010/0145794 A1* | 6/2010 | Barger | G06F 16/9535 |
| | | | 715/205 |
| 2015/0006333 A1 | 1/2015 | Silveira et al. | |
| 2018/0113878 A1* | 4/2018 | Duggal | G06F 16/1844 |
| 2018/0349408 A1* | 12/2018 | Jewell | G06F 16/1734 |
| 2019/0146644 A1* | 5/2019 | Jain | G06F 3/0484 |
| | | | 715/738 |
| 2020/0257437 A1* | 8/2020 | Fitzpatrick | G06F 3/0486 |
| 2021/0056103 A1* | 2/2021 | Vellal | G06F 16/24578 |
| 2021/0058494 A1 | 2/2021 | Shepstone | |
| 2021/0067588 A1* | 3/2021 | Miller | G06F 16/483 |
| 2021/0125606 A1* | 4/2021 | Miller | G10L 25/57 |
| 2021/0326307 A1* | 10/2021 | Tana | G06F 16/168 |
| 2022/0138808 A1* | 5/2022 | Leblond | G06Q 30/0201 |
| | | | 705/14.73 |
| 2022/0292160 A1* | 9/2022 | Mehta | G06F 16/972 |

* cited by examiner

Id
Name
Description
Created
Modified
Location
Media Type (ie. PNG, JPG, TXT, PDF)
Contents
Size

* Any Additional Custom Meta

* Hierarchical Database(s) would require a "Parent ID" metadata

SYSTEMS AND METHODS FOR FOLDER-BASED CONTENT CONVERSION

CROSS-REFERENCE TO RELATED APPLICATIONS

The present application claims priority to U.S. Provisional Application No. 63/362,807, entitled "SYSTEMS AND METHODS FOR FOLDER-BASED CONTENT CONVERSION", and filed on Apr. 11, 2022. The entirety of the above-listed application is hereby incorporated by reference for all purposes.

FIELD

The disclosure relates generally to generating a folder-based content management system and related methods for using the folder-based content management system

BACKGROUND

Content management systems are used to deliver content through a number of digital channels. Such content management systems have been utilized for the creation and modification of digital content, such as publication of content as a website on the Internet. However, use of content management systems may be difficult during initial set up when there are large content sources to be integrated and updated. Further updating a large content website may be time-consuming and may require specialized skills.

For example, there may be numerous types of content management systems available to a user which may each compose and distribute content differently. As one example, in a page-based content management system, every piece of content may be a page. Query capabilities may be limited, therefore constraining how the data may be used. As another example, item-based or object-based content management systems may distinguish between the page and the content, allowing many different content items to be placed and reused across different pages. A headless content management system, for example, may be designed to allow the user to request content via a query delivered as raw or structured text, such as JSON or XML.

A database for the content management systems presents an additional challenge. Most conventional content management systems use, for example, MySQL for database management and queries. It may be desirable to omit the database entirely and, instead use flat files (HTML, CSS, media, etc.). With each decision incorporated into an architecture of content manipulation (e.g., CMS, Database, Delivery method, querying, etc.), complexity is added to web applications.

Furthermore, for already existing infrastructure, such as servers, websites, etc., it may be challenging to edit the infrastructures due to a lack of structured organization of the infrastructure content. A system and method for converting the existing infrastructures such that editable elements of the infrastructures can be identified and re-organized into a useful and readily managed construct is needed.

SUMMARY

A folder-based content management method and system are provided to organize large quantities of content. In an example method and system described herein, the method and system may include use of a folder-based content management system. A user may employ normalized content folders to the folder-based content management system utilizing familiar interfaces.

In one embodiment, a method is executed via a processor based on instructions stored on non-transitory memory of the processor. The method includes converting an existing infrastructure into editable assets, and organizing the editable assets into a structure of a folder file system by recombining the editable assets into a new format. The folder file system may be rendered with the new format as a graphical user interface (GUI). Converting the existing infrastructure includes at least one of crawling an existing website and converting web pages of the website into the editable assets, and converting a website's server response into raw data and recombining the raw data into a new format. For example, the existing infrastructure may be an ad server which is converted to an asset folder of ad files, and the ad files are organized by file type and/or by campaign. Additionally or alternatively, the existing infrastructure may be an image server with digital assets. In this way, the existing infrastructure may be converted into an editable structure that can be published on different platforms and optimized for searching.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 3 shows an example of metadata of a file or which may be used for organizing a variety of file types, according to an embodiment;

FIG. 15 shows a second example of data stored at a web server which may be extracted by a web crawler of the process of FIG. 13, according to an embodiment;

DETAILED DESCRIPTION

Figure 1A:
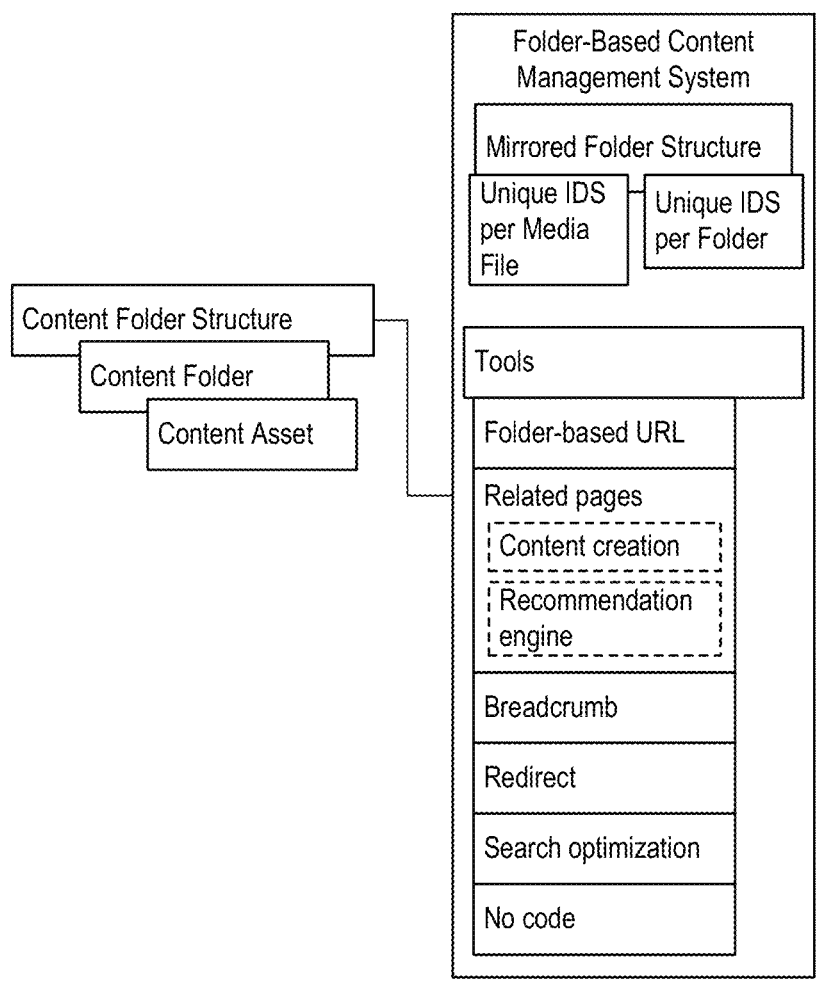
FIG. 1A shows a schematic illustration of an example folder-based content management system, according to an embodiment.
Figure 1B:
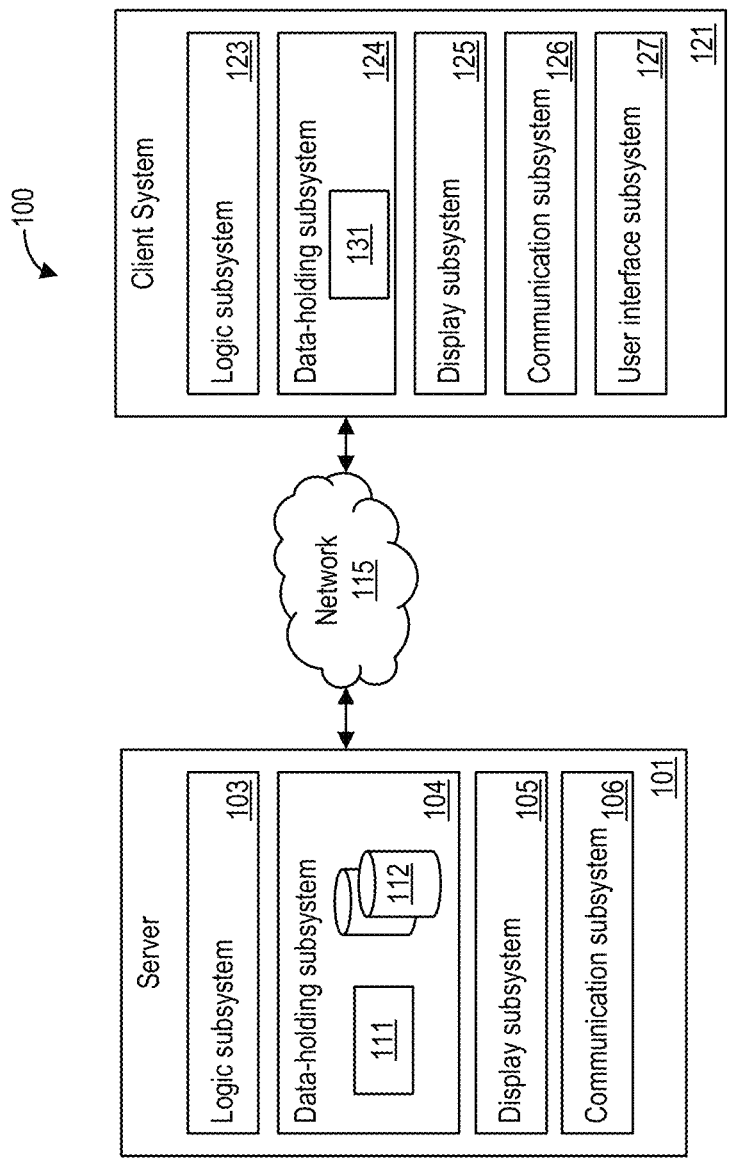
FIG. 1B shows block diagram illustrating an example networked computing system for automatically generating a website, according to an embodiment.
Figure 2:
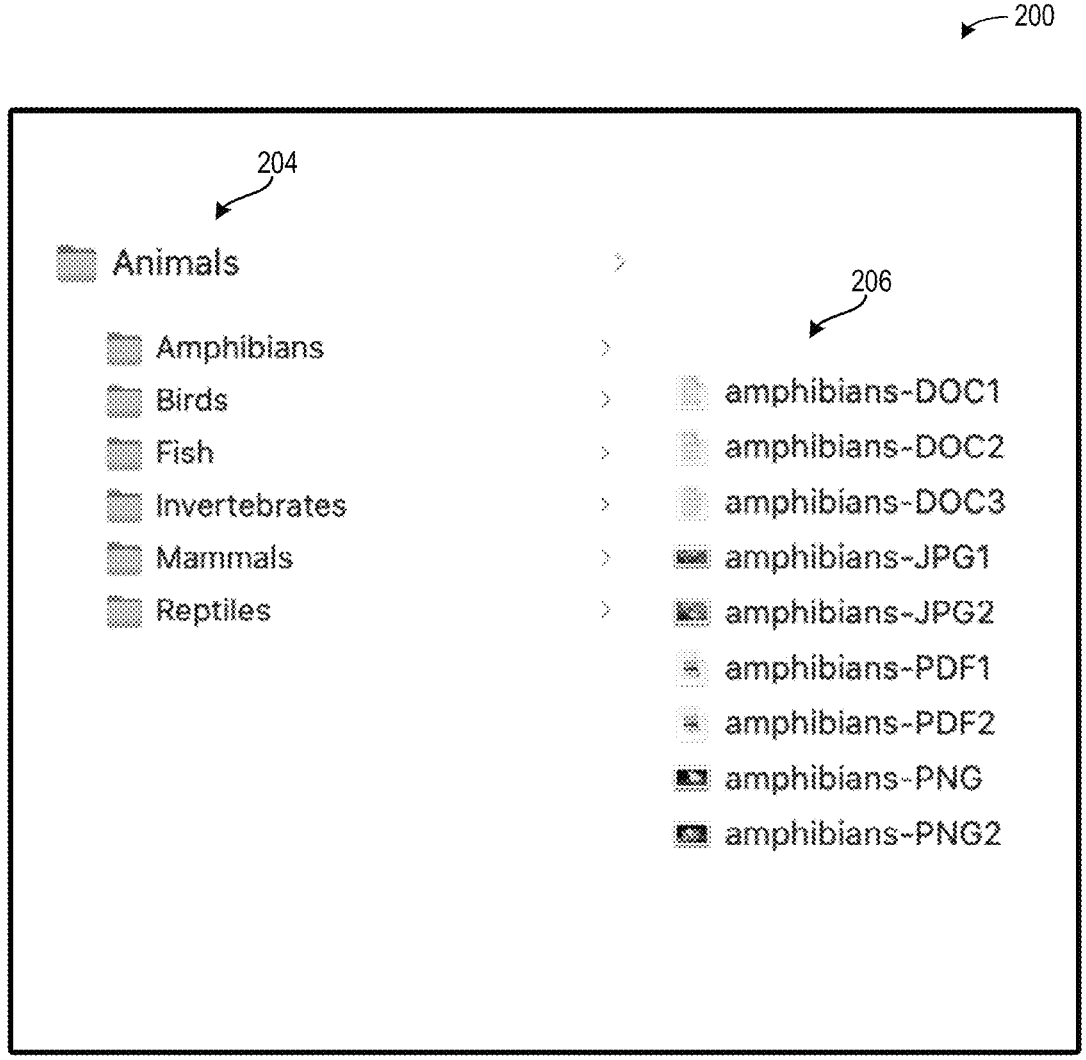
FIG. 2 shows an example of a client graphical user interface (GUI) file system, according to an embodiment.
Figure 4B:
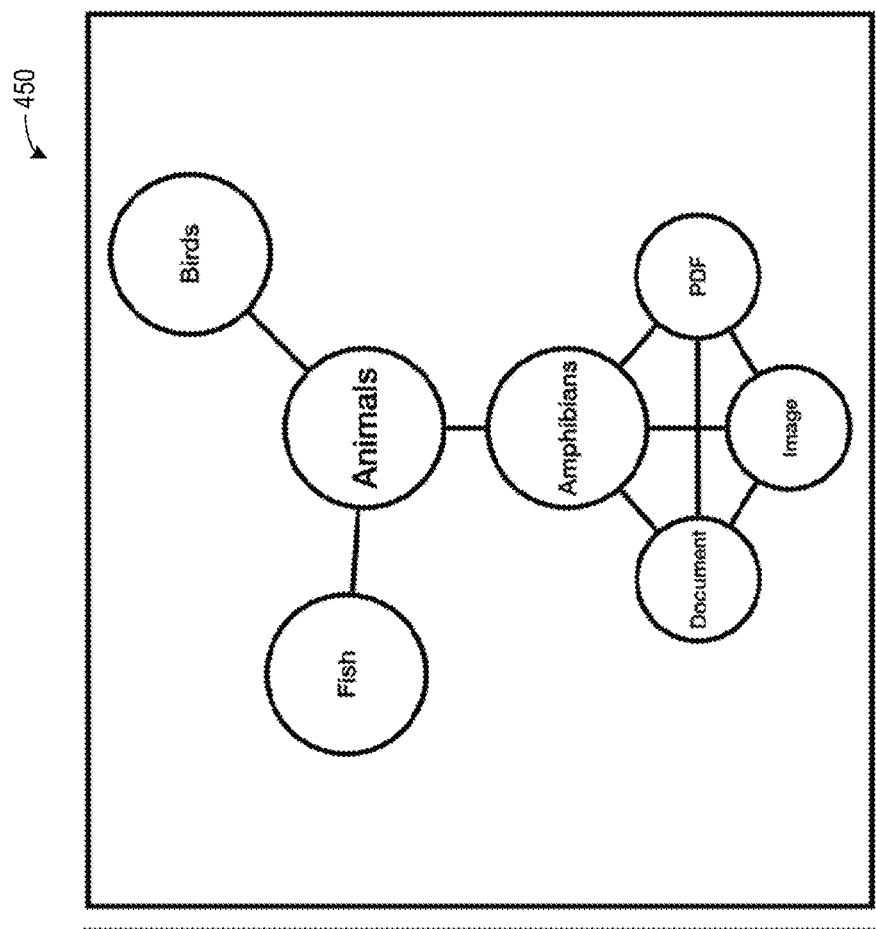
FIGS. 4A and 4B show representations of different data structures of the file system, according to an embodiment.
Figure 4A:
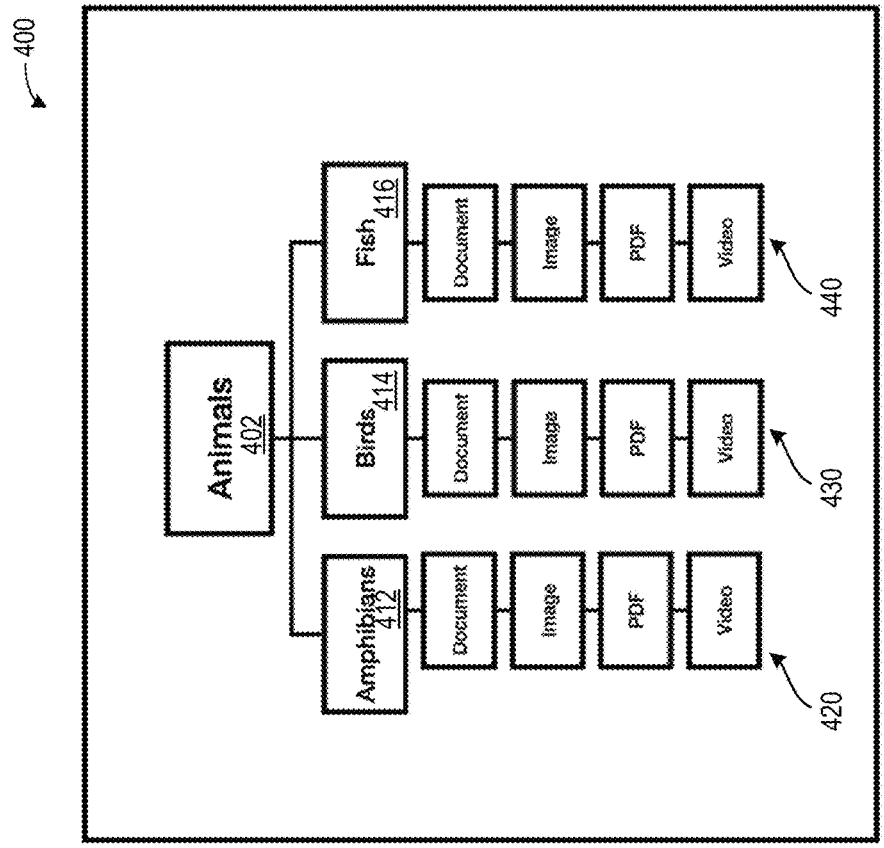
Figure 5:
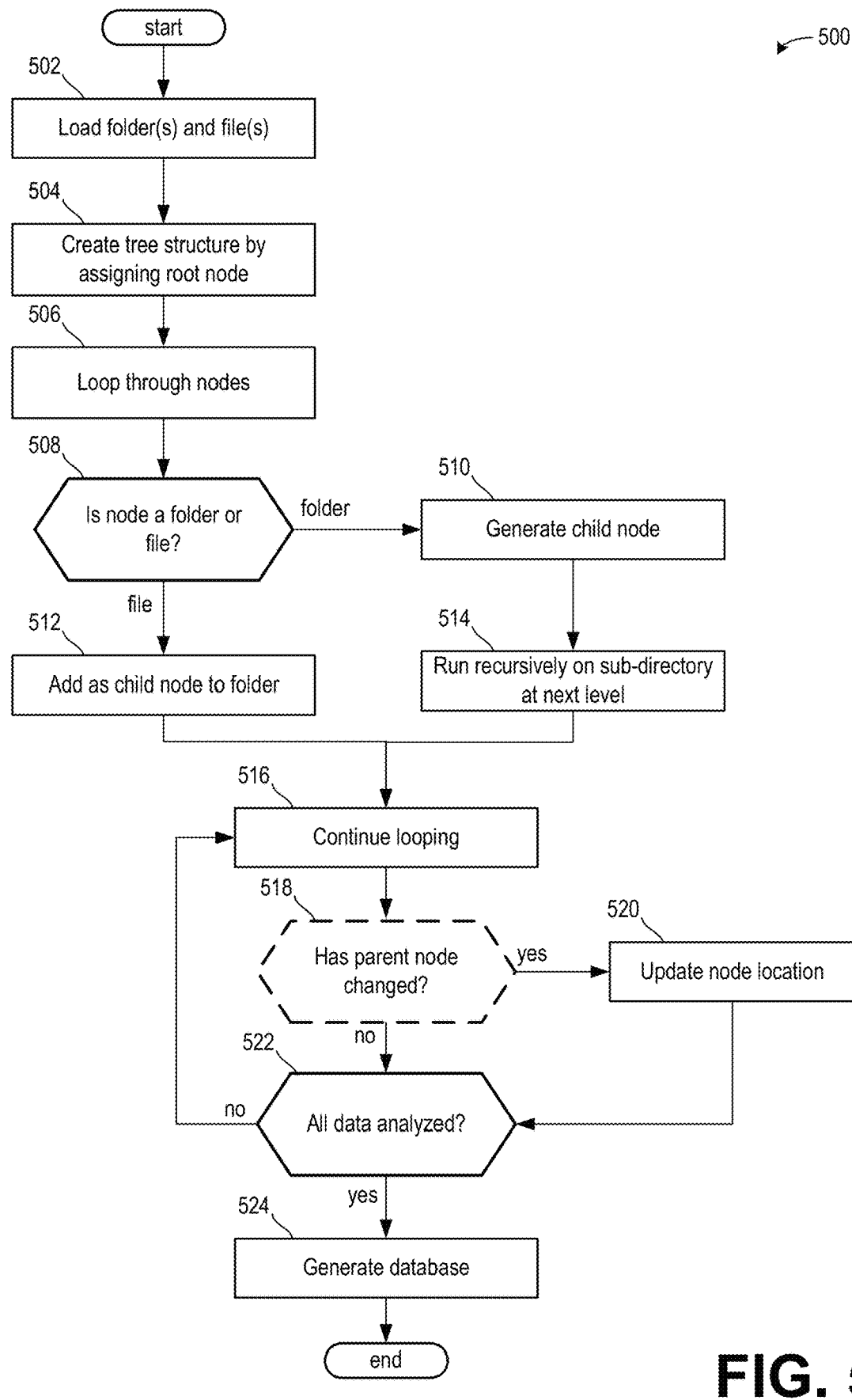
FIG. 5 shows a method for reading a file system and its folders and files, according to an embodiment.
Figure 6B:
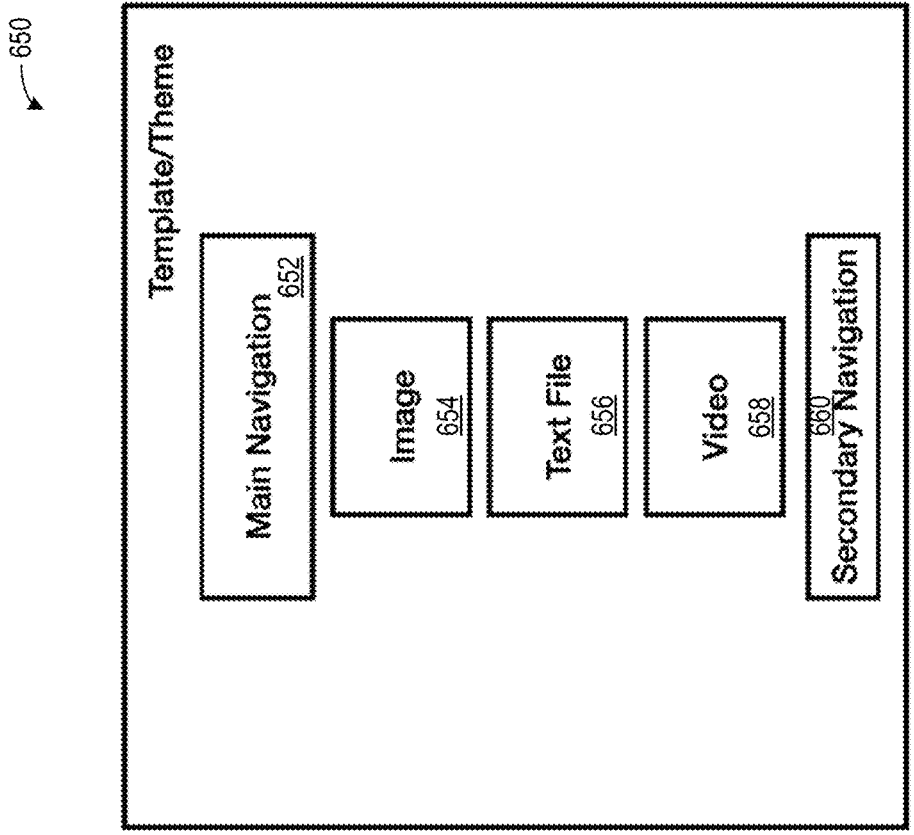
FIGS. 6A and 6B show a website GUI and a mobile app GUI, respectively, according to an embodiment.
Figure 6A:
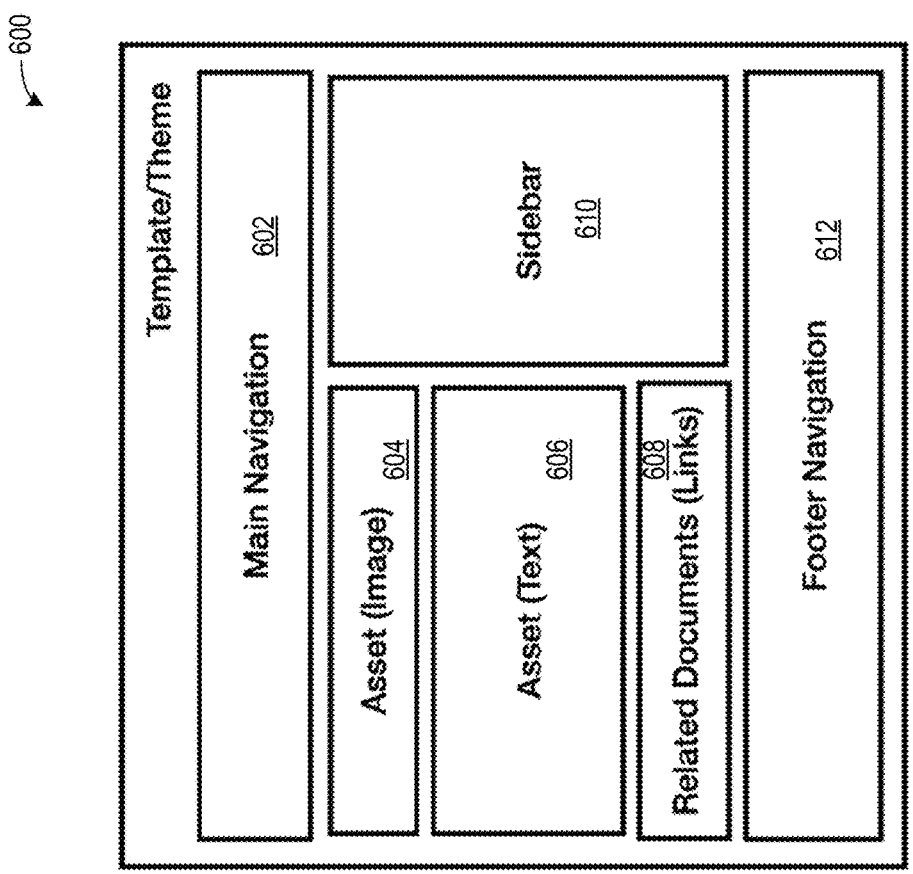
Figure 8:
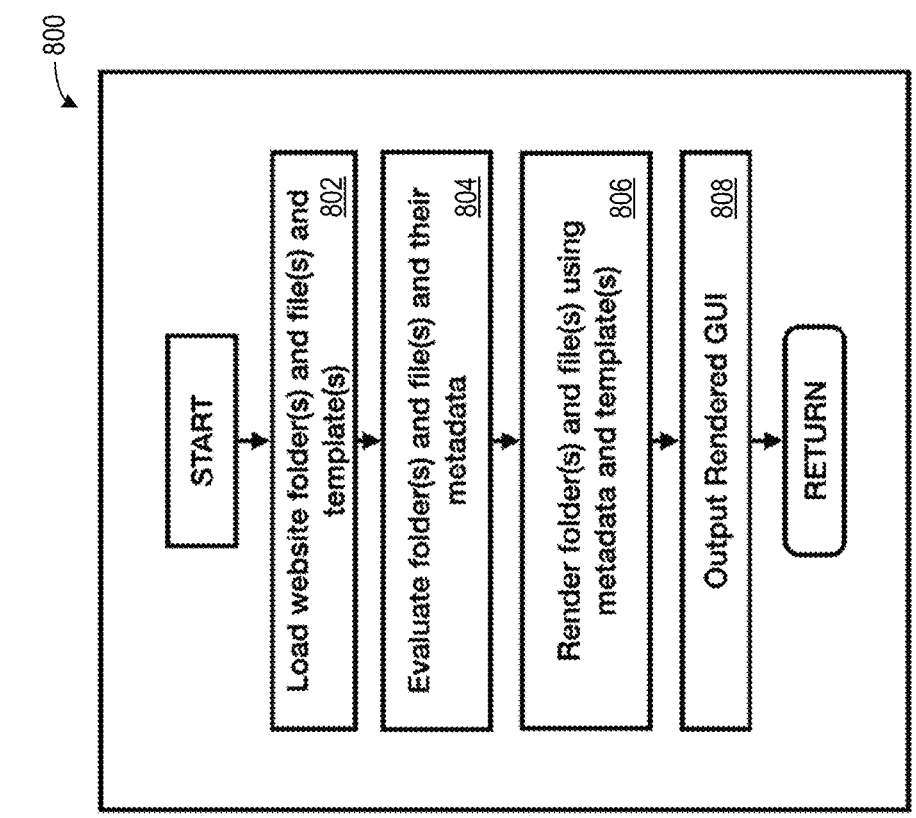
FIG. 8 shows a method for retrieving the metadata and inputting the metadata into a templating engine for rendering of a web application, according to an embodiment.
Figure 7:
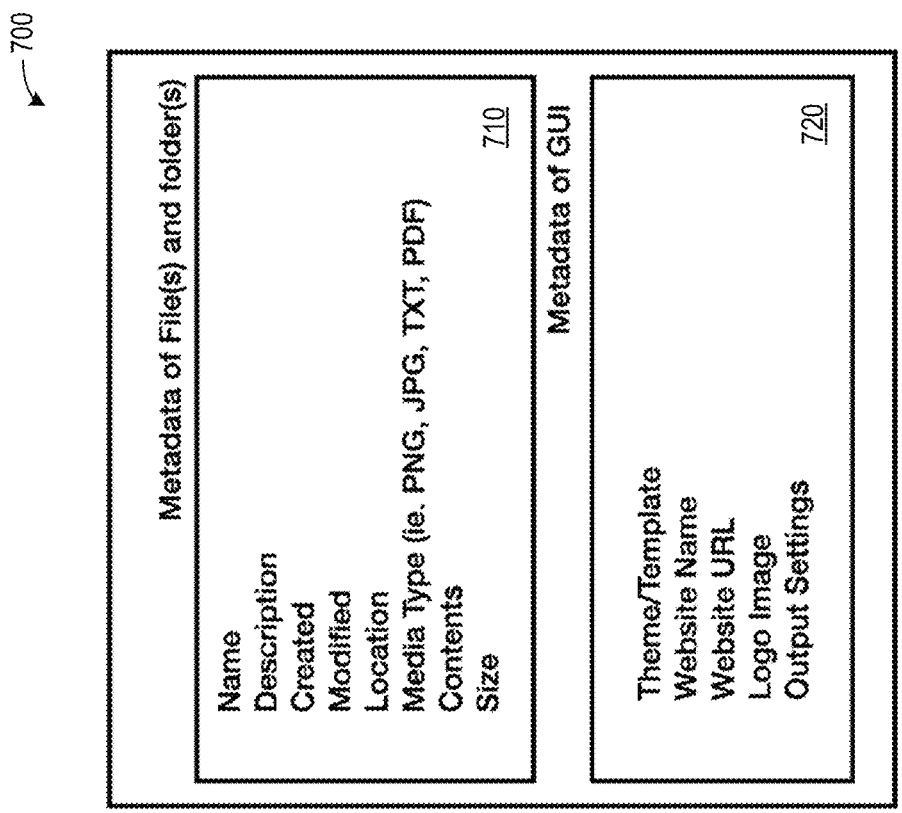
FIG. 7 shows metadata stored on files and folders and the GUI for rendering of a web application, according to an embodiment.
Figure 9:
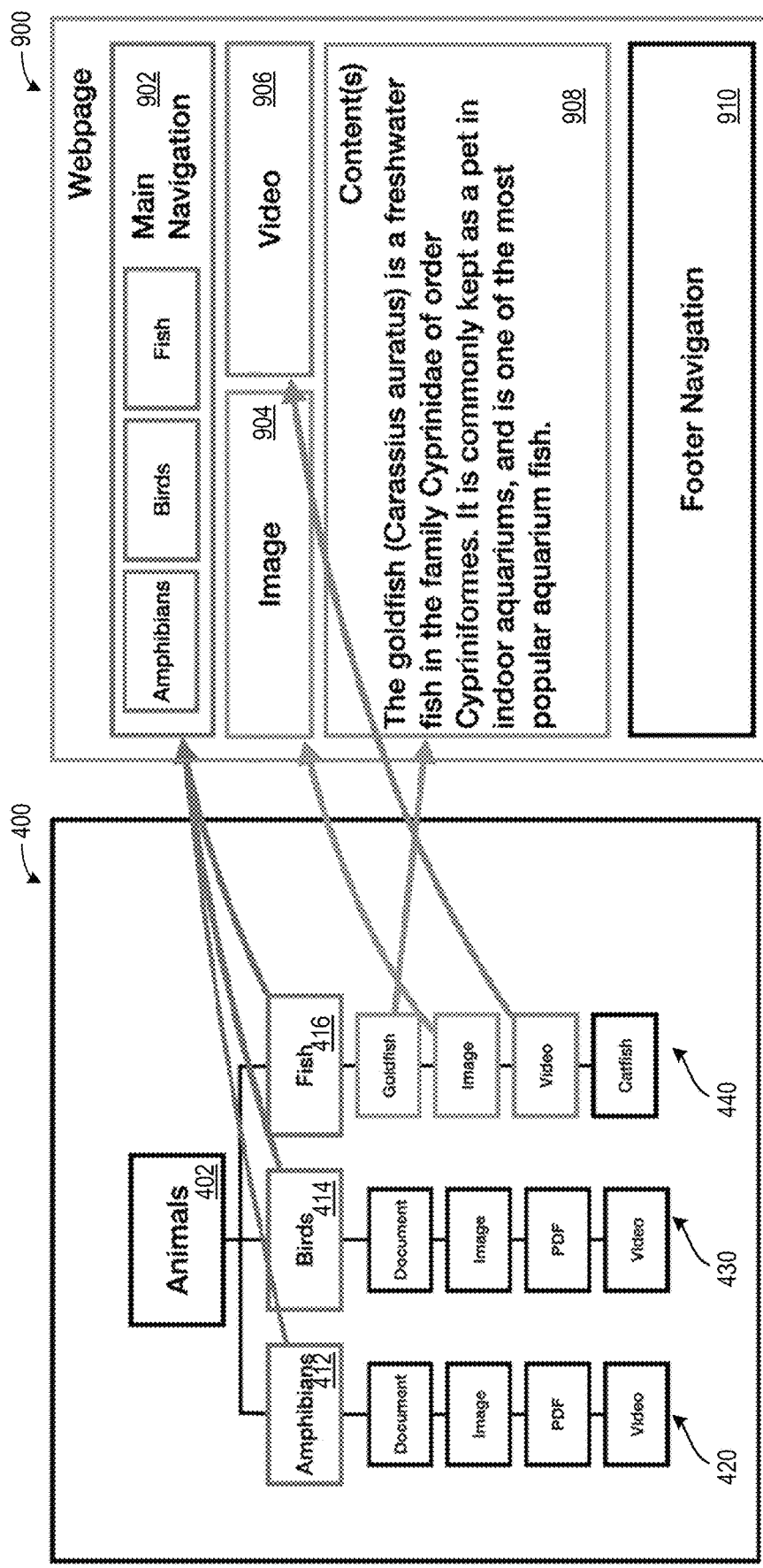
FIG. 9 shows an example process for transferring data from the file system to a website GUI, according to an embodiment.
Figure 10:
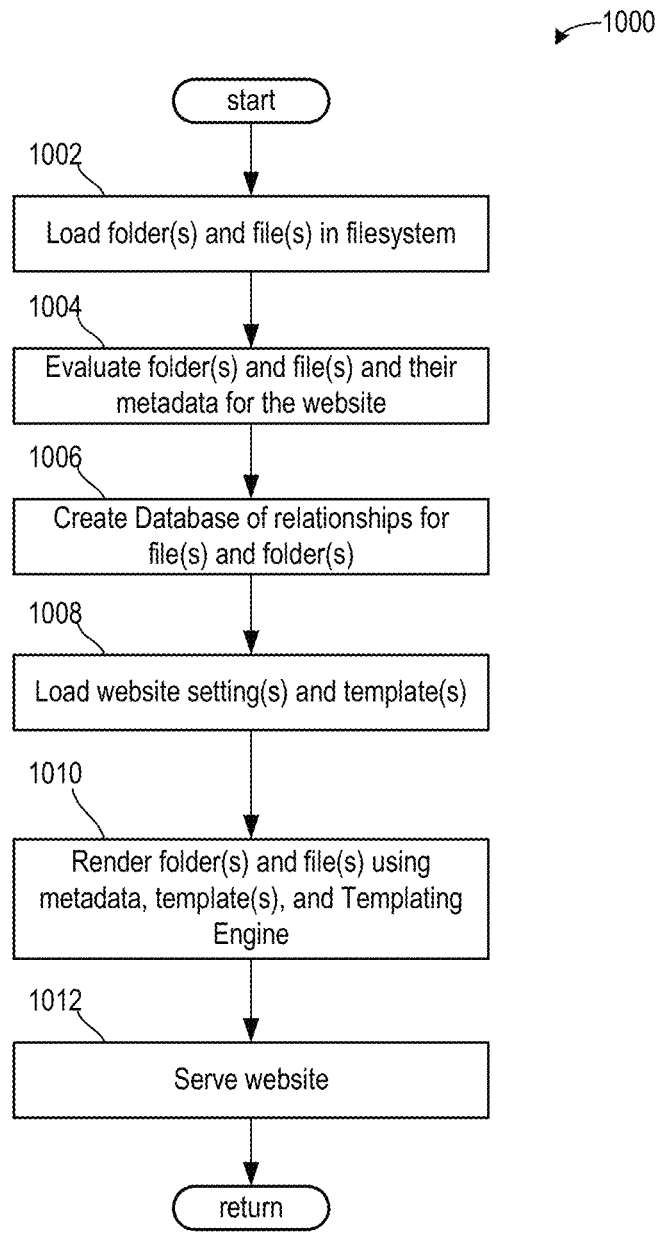
FIG. 10 shows a method for generating a website from a file system of folders and files, according to an embodiment.
Figure 11:
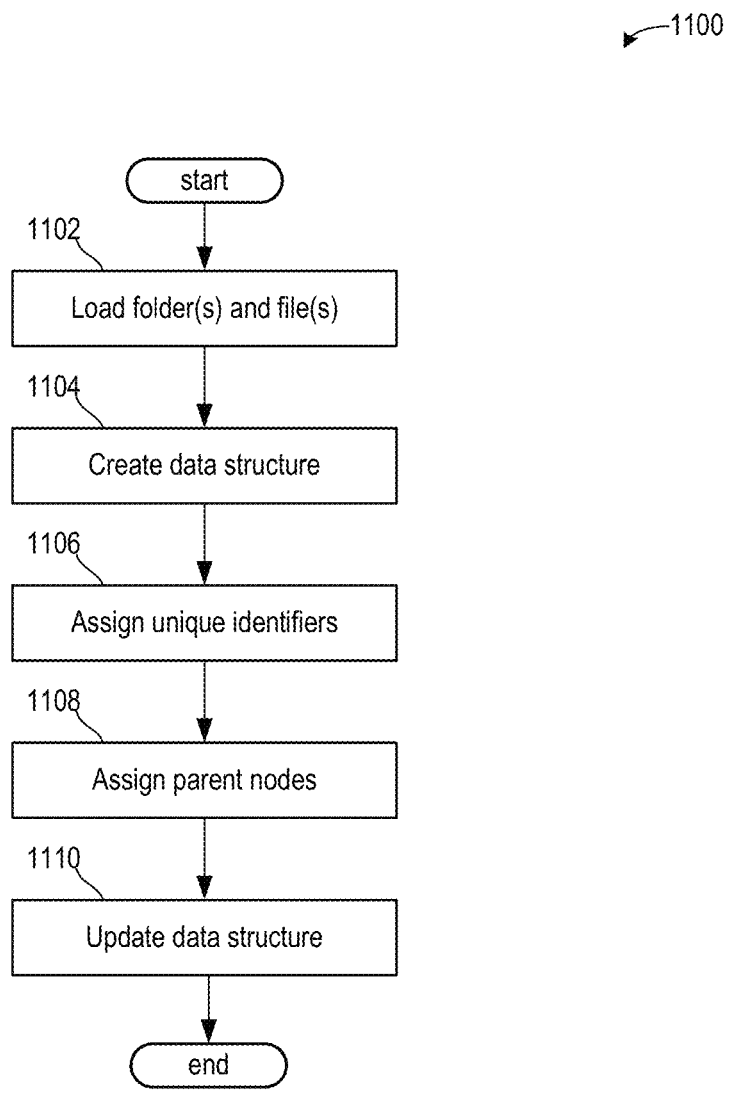
FIG. 11 shows a method for processing a file structure to be absorbed by a content management system, according to an embodiment.
Figure 12:
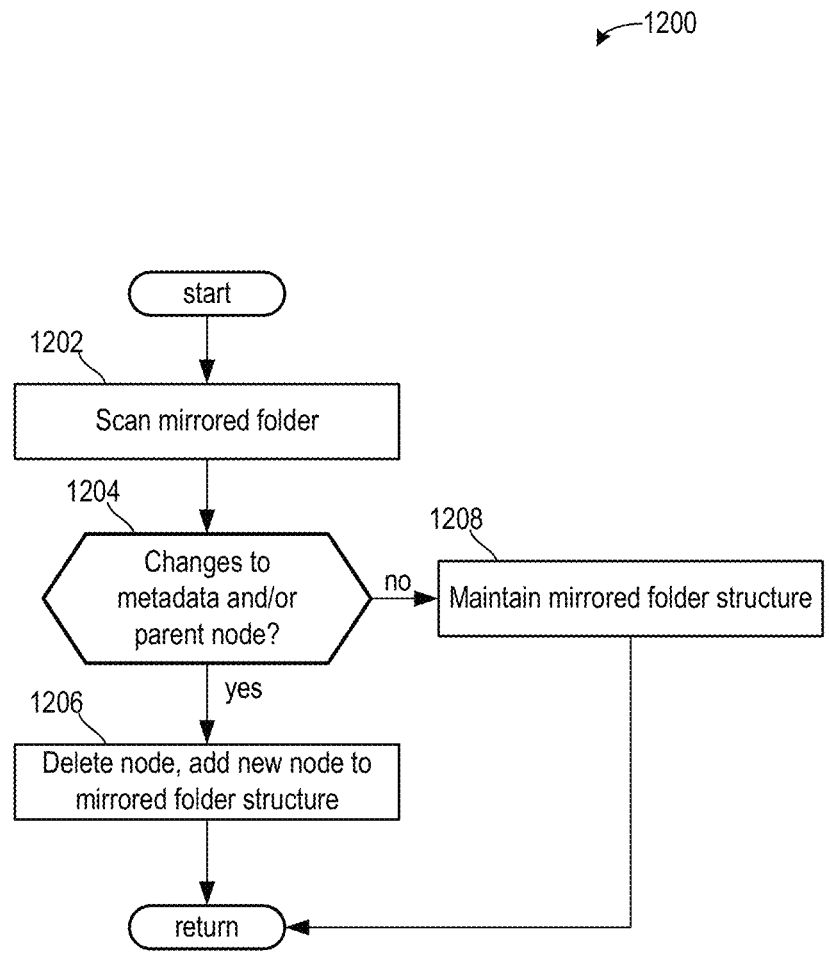
FIG. 12 shows a method for updating a file structure by a content management system, according to an embodiment.

The following description relates to various embodiments of a folder-based content management system and method. As depicted in FIG. 1A, an example folder-based content-management system is provided. FIG. 1B shows a use of the folder-based content management system, specifically, the system may generate web pages from the folder based content-management system which are delivered to client systems via a network. Users of the client systems may view web pages displayed in a browser of the client system, for example. Additionally or alternatively, the system may store and query any type of file or digital information, such as graphics, design file, filed paperwork, etc. An example of a client GUI and example folder structure where the client may upload various file types and organize the files across a plurality of folders is shown in FIG. 2. A mirrored file system for organizing the file types based on data contained therein is shown in FIG. 3. The file types may be interpreted as various data structures (i.e., trees and graphs), examples of which are shown in FIGS. 4A and 4B. A method for reading a file system is shown in FIG. 5. FIG. 6A shows a website GUI and FIG. 6B shows a mobile application GUI. An example of metadata stored on files and folders for rendering a web application is shown in FIG. 7, and a method for retrieving the metadata and inputting the metadata into a templating engine to render a web application is shown in FIG. 8. An example of transferring the metadata from the file system into a selected template is shown in FIG. 9. An overall method for generating a website GUI from a file system is shown in FIG. 10 and a method for processing a file structure to be absorbed by a content management system is depicted in FIG. 11. A method for updating a mirrored file system by the content management system is shown in FIG. 12. Conversion of a web page into editable assets is shown in an example process of FIG. 13 and examples of how data is extracted, organized, and output are depicted in FIGS. 14-19. An example of a method for converting an existing infrastructure, such as a website, into a mirrored file system to generate a new infrastructure is shown in FIG. 20.

It should be appreciated that although digital information, such as graphics, design file, filed paperwork, etc. are described herein, the systems and methods may be implemented for a folder-based content management configured to transform folder content into digital content, such as for a customized website. The folder content may incorporate a number of folder assets which may be transformed as digital content. The folder assets may include a variety of mixed file types including sub-folders, document file types, image file types, video file types, music file types, PDFs, PNGs, JPGs, TXTs, spreadsheet file types, and the like. The content may further include other asset types such as source code, data feed types, data sources, lists of other files, application files, code files, formats, archive documents, binary data, etc.

As shown in FIG. 1A, a folder-based content management system 10 may consume a content folder structure holding content folders and content assets. In consuming the content folder structure, the folder-based content management system may include a mirrored folder structure. The mirrored folder structure may assign unique IDS to the folders within the folder structure. Tools, such as folder-based URL tools, related pages tools, breadcrumb tools, redirect tools, and search tools may be applied to the mirrored folder structure. Properties of the content folder structure, such as folder position, folder hierarchy, creation date, author, etc. may be utilized by the tools to generate digital content, including a website or webpages.

As described in more detail below, the folder-based content management system utilizes a folder-based interface. The folder-based interface includes a folder/sub-folder hierarchy where any number of content folders and sub-folders are organized in the file structure. In contrast to prior content management systems, each which has a different interface, the folder-based content management system utilizes the user's folder file structure such that the interface is familiar. By applying file structures, file systems can utilize common data structures, which simplifies coding. The file structures may further be intuitive, thereby allowing their use to be more user-friendly. Coding a content management system in this manner may deliver "no code" solutions and enable non-technical users to create applications using intuitive actions directed by non-code language. For example, "Render a navbar using the names and URLS of all folders at Depth 1" may be entered by a user and accurately interpreted by the content management system. In other words, natural language may be recognized by the content management system to generate appropriate response actions.

Moreover, use of the file system provides process flow that allows the user to customize the workflow for their organization. An example of process flow used in content management systems may include incorporating published and unpublished content or "drafts". Files and folders may be set for "development mode" or "production mode". Moving files between folders may change the mode of the file. For example, moving a first file from a first folder to a second folder may change the mode of the first file from development mode to production mode. Furthermore, setting a file or folder to "hidden" or "visible" may indicate a state of the file or folder.

Another example of process flow may include user permissions. An organization may assign permissions and roles to its users granting them access for what they can do and cannot do. An assigned "Editor" may allow access to change a file, while a designated "Manager" may allow access to delete a file. Further, permissions may be given based on the file type. For example, in designing a website, file access may be narrowed to image files (e.g., Photoshop files) in order to simplify workflow and reduce a likelihood that all website assets are shared.

The folder-based content management system may consume the structures of the folders and the folders' files as data. This may enable automatic metadata creation and embedding of the metadata into the code of the folder system. Code and content may be separated where the structure is mirrored as part of the content management system. The content may be carried forward as part of the structure. In this way, the folder-based content management system may be a "headless" content management system. The content may be available through an application programming interface (API) for display on any device without a built-in front-end or presentation layer.

In the folder-based content management system, the folder structure of the content, including metadata, may be directly absorbed by the content management system. Turning now to FIG. 11, it shows a method 1100 for processing the file structure to be absorbed by saving the file structure as a data structure, such as a tree structure. By transferring the file structure into the data structure, files of the file structure, and the constructed data structure may be mirrored. The method 1100 and the rest of the methods herein may be executed via instructions stored on memory of a logic subsystem, as described below in FIG. 1B, that when executed, enable processors of the logic subsystem to analyze assets and read metadata thereof. The instructions for executing FIG. 11 may be algorithms included in a set of algorithms defining the folder-based content management system.

The method 1100 begins at 1102, which includes loading the one or more folders and files, which may be a content folder having content including a plurality of assets, e.g., folder assets. Loading the one or more folders and files may include retrieving the one or more folders and files from a file structure of the data-holding subsystem of a client system or a server. In one example, the one or more folders and files loaded may be marked or otherwise indicated by the client to be included in a website generation. In another example, a subfolder or single item may be loaded and updated within a larger folder. To save time, a system may scan for changes in individual items or subfolders and load only the items affected by a change.

In another example, loading the one or more folders and files may include acquiring the plurality of assets from a website. The plurality of assets may include file content of the website which may be retrieved from a separate file folder system, such as a cloud. For example, the separate file folder system may be loaded internally, or may be loaded from an editable form of the website. The file content may be transformed into mixed assets, e.g., folders and files, where the file content may include various website components from which the website is rendered. As one example, the website components may be stored in the one or more folders and files for the website as a file structure.

Method 1100 proceeds to 1104 to create a data structure. The data structure is created to represent each item in the file structure, e.g., folders, files, files, images, PDFs, etc., along with respective metadata for how the items are related. The file structure may be the file structure stored at the data-holding subsystem of the client system or server or the file structure retrieved from the website. An example data structure for representing a file structure is a tree including a single root node that branches off into child nodes (as shown in FIG. 4A). A node may be a single system for storing and processing data.

Method 1100 continues to 1106 to assign a unique identifier to tag each node, in the example of the tree structure, where each node corresponds to a file asset, an image asset, short-cut assets, pointer assets, or other website components such as raw data. At 1108, each node is assigned a parent node using the parent's unique identifier, as assigned at 1106. When a node is assigned to a parent node, the node becomes a child node. Sibling nodes are child nodes that have the same parent node. A leaf node is any node that does not have any further children. Each node in the tree contains data unique to the node. For example, an image node may contain data regarding the filename or file type, while a document node may contain data on its text contents or revision history.

At 1110, method 1100 updates the data structure as items are added, updated, or removed from the folder-based content management system. The changes are reflected in the tree structure. For this reason, the mirrored data structure is constantly in sync with any changes made in the content management system. The mirrored data structure may be set up such that changes are broadcast to trigger updates to remote applications in real-time. As the tree structure grows, updates may take longer. Syncing may be configured to only re-sync dependencies for breaking changes. For example, changes may be detected at a specific level by comparing timestamps and only sections where changes are present may be synced. In contrast, for example, a conventional technique for detecting changes may include using "Diff" (a data comparison tool) for files and folders, which may be more computing-intensive and time-consuming and demand a burdensome amount of bandwidth. Method 1100 ends.

Returning to FIG. 1A, the folder-based content management system enables customization of the folders, and in some examples, a subsequent matching website. For example, the folder-based content management system may enable conversion of the file content used to generate a website, such as a static website and associated webpages. The file content, including metadata, may be mirrored in the static website. This process may also be done in reverse, by taking an existing website and breaking it down into its components and creating a new mirrored file structure with updated metadata. For example, website components such as, for example, folders, files, images, PDFs, etc., along with respective metadata for how the components are related, may be identified by the folder-based content management system.

A mirrored file structure may be generated from the website components, which may be stored by the file-based content management system, in one example. In another example, the mirrored file structure generated from the existing website may be used to generate a new website, which may include the same website components as the existing website but have a different layout corresponding to a selected template, as further shown and described with respect to FIGS. 6-10. In a further example, components of the existing website, as stored in the mirrored file structure, may be removed, have other components added, or otherwise be changed. Metadata of the mirrored file structure may be accordingly updated and a new website may be generated, as further described with reference to FIGS. 6-10, including the updated metadata, which may be embedded into a code of the new website. Converting an existing website's content to use a mirrored folder-file system instead of a traditional, e.g., conventional, database can be achieved by converting a website's server response, which may be a set of files, into raw data that is stored in folders and files. The stored raw data may be recombined into a new format.

Integrating the folder-based content management system with the user's content folders supports updates and revisions when the content files are moved or otherwise changed. For example, moving a content folder as a subfolder from one folder to another folder may result in automatic adjustment of the corresponding webpages, the associated content, as well as all the data and metadata associated with any of the folders or content.

In one example, a drag and drop feature of the folder-based content management system may allow movement of folders and resources by a user and may include addition of a new document or asset inserted into a folder. Use of the drag and drop feature may result in automatic sync as well as recalibration of breadcrumbs and metadata based on the new document or asset inserted into a folder. Mirrored data and/or the mirrored folder may also auto sync.

For example, a notification such as a webhook may be received, where the webhook is a technique for modifying the behavior of a web application with custom callbacks. A continuous integration/continuous delivery or deployment (CI/CD) pipeline may be set up to trigger automatic builds of a website or application based on changes to the mirrored data and/or the mirrored folder. Additionally or alternatively, custom user-defined rules, such as updating daily, or by file type, by folder, by depth, etc., may be implemented, which may enable more frequent auto syncing of the mirrored data/folder and website. Elements which may be moved and/or updated by the use of the drag and drop feature, such as breadcrumbs, will be further described below. As such, auto sync may be desirable for dynamic websites where changes are expected and reflected in real-time. For example, in a dynamic website, the mirrored folder structure may be queried similar to a traditional MySQL "database query" such as "SELECT ALL FOLDERS AND FILES THAT ARE NEW".

As shown in FIG. 1A, a related pages tool may be used to identify related pages and/or content. The related pages tool may utilize a related algorithm using the file system database. In the case of using a tree data structure to represent the file system, a related pages algorithm may identify siblings of a node as pages and/or content related to the node where a sibling node may be a node that has a parent node in common with another node, as described above. Additional tagging metadata, e.g., folder meta tags, can also be used for each node to find related nodes as defined by the user.

In some examples, the related algorithm may allow related pages to be found across the folders or within the same folder. If the nodes are unorganized, an internal tool can be used to re-organize all content assets within a folder or the mirrored file system using AI and machine learning. This may optimize placement of web pages in a website according to an order or site structure perspective and connect the content assets to user analytics and assets selected by user. New trees, structure, and systems may be recommended based on the content topics or data which may be re-organized in a more efficient manner to enhance user experience, search engine optimization (SEO), etc.

As an example, automatic hyperlinking of resources (documents, images, PDFs, etc.) within a document can also be achieved by looking at sibling nodes within the same folder or other folders and files within a same folder path. Furthermore, auto-movement of pages or content based on user data or auto sync based on the mirrored folder structure may be enabled to convert content into any content management system (CMS) structure. A content creation tool or recommendation engine may be created to offer recommendations for new files to add to folders. In this way, contextual advertising may be made easier due to organization of files into relevant folders (topics).

As shown in FIG. 1A, a folder-based URL tool may be provided to generate URLs tied to the file structure. The folder-based URL tool may provide a consistent structure to the webpages and the content even when the website is scaled. The folder-based URL tool utilizes the folder-based structure to generate the URLs. For example, the folder-based URL tool may integrate the name of the folder, the path of the folder, and the depth of the folder in the folder structure as the URL. The content of the folder is thus represented by the URL, although the URL is not, in and of itself, reliant on any specific content. In the case of using a tree data structure to represent the file system, the folder-based URL tool may generate the URL for a particular node using its parent node and may climb the tree data structure until it reaches a corresponding root node. In one example, the root node for the file system may have a URL with a single slash "/" while a child, called "Basketball" for example, of the root node may have a URL of "/basketball/". A child node, called "Basketball Shoes" for example, of the basketball node may have a URL of "/basketball/shoes/" whereas if the child node is a child node of the root node, it may instead have a URL of "/basketball-shoes/". Each slash may be used to denote a sub-directory.

URLs are configured according to two styles, either file-based URLs or directory style URLs. A directory-style URL ends in a slash, while a file-based URL ends in the file's name. When navigating to a directory-style URL, such as "/basketball/" the server may respond with a default file name called "index.html" inside of that folder, which, without a page present, may display all files within that folder. When a page is added to the folder, the page may be included on that list. On a web server, a page becomes a folder only if it contains other pages inside of it. For example, "/soccer/" may be a custom page. In contrast, a "/soccer/cleats/the/soccer/" page may be displayed as a folder showing all pages inside of it. In this way, templates for folders and files may be readily designed as web servers already configured to display files inside of folders. It may also be desirable to provide custom content at a page of a folder. Folders may have a corresponding file from which content may be pulled.

When navigating to a file-based URL such as "/basketball/image.png" the server may respond with a resource called "image.png". The folder-based URL tool may be used for creating SEO-friendly URLs. To keep the URLs short, duplicate words may be removed as preferred by the user. For example, using the folder-based URL tool for a node for a file called "Kids Basketball Shoes For Youth Basketball" may create a shortened URL of "/basketball-shoes-for-youth/". To avoid duplicate URLs, a series of numbers may be applied to the end of the URL such as "/basketball/shoes-86950/".

The contents of a URL may assist in optimizing search engine or search engine optimization (SEO) operation. For example, search engines may use keywords in the URL to better understand the contents of the linked resource. The folder-based URL tool may generate concise and descriptive URLs that fit a style easily understood by search engines. Additionally, depth of the URL may influence an ability of the search engine to locate a file. For search engines, maintaining the depth no more than 4 folder depths may be desirable, as a difficulty of locating a file increases with file depth. A depth setting may be set using the folder-based URL tool to create URLs up to a target depth in the file system. For example, a depth setting of 1 may create URLs at a maximum of one level deep. The contents of a URL may also be important for analytics platforms and reporting. Less work (e.g., computing effort) may be demanded to analyze a set of pages by URL, if the set of pages are underneath segmented topics. For example, analysis of a website may be more difficult when all of its URLs are underneath one folder such as Root (e.g., a root node). By breaking up URLs into topics, benefits of the SEO, as well as from analytics, may be obtained. For example, the folder structure allows the SEO to be completed in a more streamlined manner, allowing URLs to be formed from the folder assets and metadata. Further, assets of the folder structure may be readily viewed in a browser.

Likewise, a breadcrumb tool, as shown in FIG. 1A, may be used within the folder-based content management system 10. The breadcrumb tool uses the file system as a database for the website to generate the path to the file using the folder structure. In the case of using the tree data structure to represent the file system, the breadcrumb tool may generate breadcrumbs for a node by climbing up the tree until it reaches the root node. By collecting those nodes along the path from the node's position in the tree until the root is reached, breadcrumbs may be rendered.

Generation of breadcrumbs may assist in search engine optimization, as the breadcrumbs locate where a resource is on the server by showing the path from the root node to the resource, or vice versa. If a node is moved in the tree to a new location, the breadcrumb tool may update the breadcrumbs. The breadcrumb tool may automatically rename breadcrumbs based on various factors within the content system and structure. More than one path of breadcrumbs, such as two paths, may be shown when a file is located in multiple places. Alias files (e.g., references, pointers) or shortcuts may be used within a folder file system to have a file live in multiple locations, and shortcuts may allow files to be placed in multiple folders. As such, two paths of breadcrumbs may be shown to a user.

As shown in FIG. 1A, a redirect tool may be further integrated within the folder-based content management system 10. The redirect tool may provide redirects as a user moves a file within the file structure. The movement may be tracked using redirects on the website. This automatic deployment of redirects may substantially reduce an amount of time required for a coder to manually update and process redirects. Further, setting up automatic deployment of redirects may include establishing custom triggers. For example, an action such as moving a file from its original folder to a different folder on the mirrored file system may automatically trigger a redirect.

When performing a redirect, a new URL may be created using the folder-based URL tool. A redirect may be added to the server to point an old URL to the new URL, such that, when a user requests the resource using the old URL, the server responds with a 301 redirect message, and the user is directed to the resource, which may now be linked to the new URL. The breadcrumb tool is used to update the breadcrumbs as a result of the redirect to update the path from the root node to the resource. In some instances, moving a file to a new folder without changing its URL may be preferable, since search engines may treat new URLs as new pages which may affect the ranking for that page. With a mirrored folder file system, a file may be moved while retaining the option to keep its original URL.

A no code tool may be used to render the front-end, which may result in efficient front-end rendering with short rendering time and reduced CPU power usage. For example, websites containing thousands of files to be rendered for multiple pages may have a long rendering time and use a large amount of CPU power compared to a website with one hundred files to be rendered for one page, for example.

To increase rendering efficiency for websites with thousands of files, the file system structure may be filtered using the no code tool. For example, instruction may include, "Render a widget using only images updated recently". A subtree, which is a tree created from an already existing tree, may be created for particular use cases to optimize efficiency. For example, a subtree of only images or only folders can be created from a larger tree. Custom filtering may be used to create unique subtrees for a particular use case. In one example, a subtree of files updated recently may be used to render "Recent Posts" on the front-end of a website client. In the case of "rendering a widget using only images updated recently", a subtree only including images with a modified timestamp may be selected for rendering.

With static websites, it may be more efficient to re-build the entire page and, in some instances, the entire website since the dependencies may break if the metadata changes. For example, if a file is moved from one folder to another, a sidebar or navigation bar on the front-end may be changed. Utilizing subtrees, dependencies of a page may be tracked as well as changes that are affected by certain actions. As an example, if a file is moved from Folder A to Folder B, two sub-trees may be updated in response (e.g., Folder A's Tree and Folder B's Tree).

The folder-based content management system 10 may include enhancement of search engine optimization and may also incorporate a search tool, as shown in FIG. 1A. In one example, the search tool may include a search engine optimization tool, which may generate relevant metadata for search engine optimization, as well as a search application tool, which may generate relevant metadata for locating applications. A first example of the search engine optimization tool may include an exporter tool to back up the file system or website for transfer by exporting the file system or website as a ZIP file or in JSON/XML format. A second example may include using a multi-lingual tool for handling content in multiple languages. A third example may include a recommendation tool configured to offer suggestions for missing files and assets in a folder which are related to files inside the folder. The recommendation tool may, in one example, leverage artificial intelligence and/or machine learning algorithms for identifying relationships between files and assets to provide the suggestions.

The folder-based content management system may have a pre-defined content set which may be tagged, using folder meta tags, by the search tool. For example, "theme pyramids" may be used as part of the folder structure which may generate targeted metadata for the search engine optimization. For example, a sports website may be structured with "baseball", "football", "basketball", etc., matching to the corresponding file structure. Using AI and Machine Learning, suggestions for folders and files may be made based on large amounts of data. Additional data can be learned from utilizing the structure of other websites if first converted into a folder file system.

Search engine optimization further may be improved by use of the folder-based content management system URL tool. As described above, production of consistent URLs may improve search engine optimization. The content management system URL tool may generate consistent URLs based on a user's folder system—incorporating the content structure as part of the URL. The user can define the URL schema at the start of building a mirrored folder file system. The schema may be modified downstream but redirection may be desirable for consistency.

The metadata of the folder system may be incorporated as the metadata for the folder-based content management system. For example, the folder-based content management system may utilize the universal metadata design of the folder system. Metadata, such as, for example, Name, Description, Created Date, Modified Data, Author, File Type and File Size, may be customized for use with the folder-based content management system URL tool. In this way, a zip file of folders and files may be used to move or migrate a website or its digital content parts to a new provider.

The folder-based content management system may be deployed or hosted. Cloud systems may have file systems and an ability to use a file system as a cloud service. Deploying the folder-based content management system on the cloud requires limited additional conversion as the files are simply being "hosted." For example, using a mirrored file system version of the file system stored on the Cloud system may allow for modification and transformation of the mirrored file system into other forms, such as a static website. In another example, similar to the folder-based content management system, static website files may be "hosted" on the Cloud system in a form where they may be converted to HTML files by a folder-based content management system. When converting the files to the static website, a theme or set of templates may be used to transform the files. Additional clones or mirrored sub-trees may be hosted as micro servers that serve various functions on a website such as a widget.

As the folder-based content management system may scale and expand with the content expansion of the underlying file structure, a cost of hosting may be minimized as the hosting is directed to "files." Further, content management systems generally include rules and permissions for access. However, with the folder-based content management system, additional coding may be decreased as the cloud service access rules may be built in for mirrored file systems and may be applied to the file structure. Most cloud systems include directories and file systems along with an application programming interface (API) for consuming the directories and file systems as data. Custom rules may be achieved by creating a mirrored file system. To create the mirrored file system, the cloud provider's API may be used to extract and represent the metadata as a meaningful data structure, such as graph or tree. This may enable for universal schema-less storage of content and file assets that may be transformed and stored on any virtual host.

Returning to the figures, FIG. 1B is a block diagram illustrating an example networked computing system 100, according to an embodiment. The networked computing system 100 includes a server 101 and a plurality of client systems including at least one client system 121 communicatively coupled to the server 101 via a network 115. It should be appreciated that variations in the arrangement and type of components of the networked computing system 100 may be made without departing from the scope of the present disclosure. For example, the networked computing system 100 may include more than one client system 121 communicatively coupled to the server 101 via the network 115.

Server 101 comprises a computing system configured to serve web pages upon request to one or more client systems such as the client system 121. Although the server 101 is depicted in FIG. 1 as a single device, in some embodiments the networked computing system 100 may include a plurality of servers 101 configured for distributed computing. In different embodiments, the server 101 may take the form of a mainframe computer, a server computer, a desktop computer, a laptop computer, a tablet computer, a network computing device, a mobile computing device, a microprocessor, and so on.

Server 101 includes a logic subsystem 103 and a data-holding subsystem 104. Server 101 may optionally include a display subsystem 105, communication subsystem 106, and/or other components not shown in FIG. 1. For example, server 101 may also optionally include user input devices such as keyboards, mice, game controllers, cameras, microphones, and/or touch screen devices.

Logic subsystem 103 may include one or more physical devices configured to execute one or more instructions. For example, logic subsystem 103 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 103 may include one or more processors that are configured to execute software instructions. Additionally or alternatively, the logic subsystem 103 may include one or more hardware or firmware logic machines configured to execute hardware or firmware instructions. Processors of the logic subsystem 103 may be single core or multi-core, and the programs executed thereon may be configured for parallel or distributed processing. The logic subsystem 103 may optionally include individual components that are distributed throughout two or more devices, which may be remotely located and/or configured for coordinated processing. One or more aspects of the logic subsystem 103 may be virtualized and executed by remotely accessible networked computing devices configured in a cloud computing configuration.

Data-holding subsystem 104 may include one or more physical, non-transitory devices configured to hold data and/or instructions executable by the logic subsystem 103 to implement the herein described methods and processes. When such methods and processes are implemented, the state of data-holding subsystem 104 may be transformed (for example, to hold different data).

In one example, the server 101 includes a web server for automatically generating a website. In another example, the server 101 includes a content server for providing assets such as images, videos, audio, and other types of files for embedding within web pages of a website rendered at a client system 121. In particular, as described further herein, a website generator tool 111 may evaluate code relating to files and folders metadata uploaded to the data-holding subsystem 104, generate one or more databases 112 based on the evaluated code, and automatically generate a website without further user input. Although the one or more databases 112 are depicted as stored in the data-holding subsystem 104 of the server 101, it should be appreciated that in some examples, the one or more databases 112 may be stored in a separate computing system communicatively coupled to the server 101 and accessible via the network 115. As an illustrative and non-limiting example, the one or more databases 112 may be stored on a separate content server (not shown) that further stores images and other content for a website.

Data-holding subsystem 104 may include removable media and/or built-in devices. Data-holding subsystem 104 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 104 may include devices with one or more of the following characteristics: volatile, nonvolatile, dynamic, static, read/write, read-only, random access, sequential access, location addressable, file addressable, and content addressable. In some embodiments, logic subsystem 103 and data-holding subsystem 104 may be integrated into one or more common devices, such as an application-specific integrated circuit or a system on a chip. One or more aspects of the data-holding subsystem 104 may be devices configured in a cloud computing configuration, in some examples.

It is to be appreciated that data-holding subsystem 104 includes one or more physical, non-transitory devices. In contrast, in some embodiments aspects of the instructions described herein may be propagated in a transitory fashion by a pure signal (for example, an electromagnetic signal) that is not held by a physical device for at least a finite duration. Furthermore, data and/or other forms of information pertaining to the present disclosure may be propagated by a pure signal.

When included, display subsystem 105 may be used to present a visual representation of data held by data-holding subsystem 104. As the herein described methods and processes change the data held by the data-holding subsystem 104, and thus transform the state of the data-holding subsystem 104, the state of display subsystem 105 may likewise be transformed to visually represent changes in the underlying data. Display subsystem 105 may include one or more display devices utilizing virtually any type of technology. Such display devices may be combined with logic subsystem 103 and/or data-holding subsystem 104 in a shared enclosure, or such display devices may be peripheral display devices.

When included, communication subsystem 106 may be configured to communicatively couple server 101 with one or more other computing devices, such as client system 121. Communication subsystem 106 may include wired and/or wireless communication devices compatible with one or more different communication protocols. As non-limiting examples, communication subsystem 106 may be configured for communication via a wireless telephone network, a wireless local area network, a wired local area network, a wireless wide area network, a wired wide area network, etc. In some embodiments, communication subsystem 106 may allow server 101 to send and/or receive messages to and/or from other devices via a network such as the public Internet. For example, communication subsystem 106 may communicatively couple server 101 with client system 121 via the network 115. In some examples, network 115 may be the public Internet. In other examples, network 115 may be regarded as a private network connection and may include, for example, a virtual private network or an encryption or other security mechanism employed over the public Internet.

Further, the server 101 provides a network service that is accessible to a plurality of users through a plurality of client systems such as the client system 121 communicatively coupled to the server 101 via the network 115. As such, the networked computing system 100 may include one or more devices operated by users, such as client system 121. Client system 121 may be any computing device configured to access a network such as network 115, including but not limited to a personal desktop computer, a laptop, a smartphone, a tablet, and the like. While one client system 121 is shown, it should be appreciated that any number of user devices or client systems may be communicatively coupled to the server 101 via the network 115.

Client system 121 includes a logic subsystem 123 and a data-holding subsystem 124. Client system 121 may optionally include a display subsystem 125, communication subsystem 126, a user interface subsystem 127, and/or other components not shown in FIG. 1.

Logic subsystem 123 may include one or more physical devices configured to execute one or more instructions. For example, logic subsystem 123 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 123 may include one or more processors that are configured to execute software instructions. Additionally or alternatively, the logic subsystem 123 may include one or more hardware or firmware logic machines configured to execute hardware or firmware instructions. Processors of the logic subsystem 123 may be single or multi-core, and the programs executed thereon may be configured for parallel or distributed processing. The logic subsystem 123 may optionally include individual components that are distributed throughout two or more devices, which may be remotely located and/or configured for coordinated processing. One or more aspects of the logic subsystem 123 may be virtualized and executed by remotely accessible networking computing devices configured in a cloud computing configuration.

Data-holding subsystem 124 may include one or more physical, non-transitory devices configured to hold data and/or instructions executable by the logic subsystem 123 to implement the herein described methods and processes. When such methods and processes are implemented, the state of data-holding subsystem 124 may be transformed (for example, to hold different data).

Data-holding subsystem 124 may include removable media and/or built-in devices. Data-holding subsystem 124 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 124 may include devices with one or more of the following characteristics: volatile, nonvolatile, dynamic, static, read/write, read-only, random access, sequential access, location addressable, file addressable, and content addressable. In some embodiments, logic subsystem 123 and data-holding subsystem 124 may be integrated into one or more common devices, such as an application-specific integrated circuit or a system on a chip.

When included, display subsystem 125 may be used to present a visual representation of data held by data-holding subsystem 124. As the herein described methods and processes change the data held by the data-holding subsystem 124, and thus transform the state of the data-holding subsystem 124, the state of display subsystem 125 may likewise be transformed to visually represent changes in the underlying data. Display subsystem 125 may include one or more display devices utilizing virtually any type of technology. Such display devices may be combined with logic subsystem 123 and/or data-holding subsystem 124 in a shared enclosure, or such display devices may be peripheral display devices.

In one example, the client system 121 may include executable instructions 131 in the data-holding subsystem 124 that, when executed by the logic subsystem 123, cause the logic subsystem 123 to perform various actions as described further herein. As one example, the client system 121 may be configured, via the instructions 131, to receive a web page including one or more images transmitted by the server 101, and display the web page including the one or more images via a graphical user interface on the display subsystem 125 to a user.

When included, communication subsystem 126 may be configured to communicatively couple client system 121 with one or more other computing devices, such as server 101. Communication subsystem 126 may include wired and/or wireless communication devices compatible with one or more different communication protocols. As non-limiting examples, communication subsystem 126 may be configured for communication via a wireless telephone network, a wireless local area network, a wired local area network, a wireless wide area network, a wired wide area network, etc. In some embodiments, communication subsystem 126 may allow client system 121 to send and/or receive messages to and/or from other devices, such as server 101, via a network 115 such as the public Internet.

Client system 121 may further include a user interface subsystem 127 comprising user input devices such as keyboards, mice, game controllers, cameras, microphones, and/or touch screens. A user of client system 121 may input a request to load or otherwise interact with a web page stored by the server 101, for example, via user interface subsystem 127.

Thus server 101 and client system 121 may each represent computing devices which may generally include any device that is configured to perform computation and that is capable of sending and receiving data communications by way of one or more wired and/or wireless communication interfaces. Such devices may be configured to communicate using any of a variety of network protocols. For example, client system 121 may be configured to execute a browser application stored as the instructions 131 that employs HTTP to request information from server 101 and then displays the retrieved information to a user on a display such as the display subsystem 125.

Turning now to FIG. 2, it shows an example of a client GUI file system 200 configured to display one or more folders 204 and one or more files 206. In one example, the display subsystem 125 of FIG. 1 may display the client GUI file system 200. The client GUI file system 200 may organize assets, such as various file types, into corresponding folders. In the example of FIG. 2, the one or more files 206 illustrated may be included in sub-folder "Amphibians" of the one or more folders. Other sub-folders may include "Birds", "Fish", "Invertebrates", "Mammals", and "Reptiles". The one or more files 206 related to "Amphibians" includes documents, images stored as PNG and JPG, and PDFs. Other assets may include text files, videos, music files, and the like. Thus, the one or more folders may be organized into one or more sub-folder classifications.

In one example, the one or more files 206 may be uploaded by a client to the data-holding subsystem 104 via the user interface subsystem 127 and the display subsystem 125. Processors of the logic subsystem 103 may be configured to update the data-holding subsystem 104 by analyzing the one or more files 206 and/or the one or more folders 204 based on executed instructions stored on memory thereof. Additionally or alternatively, the client may create and organize the one or more folders 204 for organizing the one or more files 206 uploaded.

Turning now to FIG. 3, it shows an example of metadata 300 of a file or folder for a schema that mimics a file system, such as file systems used on personal laptops, desktops, and the like. In one example, the metadata 300 may be arranged in the file system as a mirrored file system structure (e.g., as shown in FIG. 0.1A) where files and folders of the file system may be stored as a remote cloud version. For example, the files and folder may be saved on the file system as data. By mimicking the file system, a client (e.g., a user) may more easily upload and organize one or more assets. In one example, the metadata 300 may be used for each of the one or more assets of the client GUI file system 200 of FIG. 2. The metadata 300 may include a unique identification of the file, name of the file, description of the file, creation data of the file, last modified data of the file, location of the file in the file system, size of the file, contents of the file, and media type of file (e.g., asset type). If the file is a child and belongs to a folder or a sub-folder, then a parent ID may be stored with the metadata 300.

Turning now to FIGS. 4A and 4B, they show a hierarchical database 400 and a graph database 450, respectively, which may be examples of data structures of the mirrored file system of FIG. 3. In the hierarchical database 400, data may be organized into a tree-like structure and the data may be stored as linked records. Each of the hierarchical database 400 and the graph database 450 may organize the data uploaded by the client in response to a relation therebetween. For example, assets within a folder or subfolder may be grouped to denote a relation between the grouped assets, thereby creating a digital representation of the grouped assets as a data structure and a database.

For example, in the hierarchical database 400, a parent folder 402, labeled "Animals", includes three sub-folders, including an "Amphibians" sub-folder 412, a "Birds" sub-folder 414, and a "Fish" sub-folder 416. Each of the sub-folders includes a variety of different files. For example, the "Amphibians" sub-folder 412 includes a first plurality of files 420 including documents, images, PDFs, and videos of one or more document, image, and video file type. Similarly, the "Birds" sub-folder 414 and the "Fish" sub-folder 416 may include a second plurality of files 430 and a third plurality of files 440, respectively, including similar or different assets with differing content stored therein. For example, the first plurality of files 420 may be related to amphibians, the second plurality of files 430 may be related to birds, and the third plurality of files 440 may be related to fish.

In the example of FIG. 4B, the graph database 450 may provide more efficient organization of overlapping assets to be included in multiple folder/sub-folders. For example, if an asset is related to birds and fish, then the asset may be linked to each of the corresponding sub-folders (e.g., the "Birds" sub-folder 414 and the "Fish" sub-folder 416) via a shortcut (e.g., a reference/pointer). This may result in the publication of the asset with each of the sub-folders on a webpage, as described in greater detail below.

Turning now to FIG. 5, it shows a method 500 for reading a file system, such as the mirrored file system of FIG. 3, and generating a database, such as the hierarchical database 400 of FIG. 4A or the graph database 450 of FIG. 4B via a folder-based content management system, such as the folder-based content management system 10 of FIG. 1. The mirrored file system may be generated by, for example, the method 1100 of FIG. 11, based on a plurality of assets retrieved from a client system and/or a website. The method 500 and the rest of the methods herein may be executed via instructions stored on memory of the logic subsystem 103 of FIG. 1 that, when executed, enable processors of the logic subsystem to analyze assets and read metadata thereof.

The method 500 begins at 502, which includes loading the one or more folders and files. Loading the one or more folders and files may include retrieving the one or more folders and files from the data-holding subsystem. In one example, the one or more folders and files loaded may be marked or otherwise indicated by the client to be included in a website generation.

The method 500 may proceed to 504 to create a tree structure, as described above, which may be performed by tools of the folder-based content management system. Creating the tree structure from the one or more folders and files may include identifying and assigning a root node, which may be determined by analysis of the metadata. As described with respect to FIG. 3, the metadata may include data regarding a branching of the asset, thereby indicating if an asset is a root, a parent, or a child asset. Identification of the asset types may indicate whether or not the file system has an organizational structure that may allow files and sub-folders to be defined as parent and/or child nodes under the root node. For example, the method may include determining if a root node is generated first and then seeing if the parent node is generated in the tree. In one example, the parent node is generated to further assist in organization of file components. In one example, generating a parent node may include classifying the node as a parent node and branching all future nodes therefrom.

At 506, the method includes evaluating and looping through the one or more folders and files, e.g., nodes. The evaluating and looping may include further analysis of the metadata of the nodes. At 508, the method includes confirming if a selected node of the one or more folders and files is a folder (e.g., a branch) or a file.

If the node is a folder, the method proceeds to 510 to generate a child node from the selected node. At 514, the method includes analyzing nodes recursively on a sub-directory at a subsequent, e.g., next, level of the tree structure. The method continues to 516 to continue looping through the nodes of the tree structure.

Returning to 508, if the selected node is a file, the selected node is added at 512 as a child node to a folder in which the file is located. The method proceeds to 516 to continue looping through the nodes of the tree structure. At 518, the method optionally includes confirming if a parent node of the tree structure changed for a large file system, which may reduce a duration for completion of the method. For smaller file systems, the method may proceed directly to 522 from 516 to determine if all metadata has been analyzed.

If, at 518, the parent node has changed for the large file system, the method proceeds to 520 to update the location of, e.g., move, the parent node. In one example, the parent node may change location which may result in the re-assignment of all previously existing child nodes to a new parent node. If the parent node no longer exists, all child nodes may be deleted. If, at 518, the parent node has not changed for the large file system, the method continues to 522 to confirm if all the metadata of the tree structure has been analyzed.

For example, all data may be analyzed if all folders and files and their metadata are evaluated and categorized. If all data is not analyzed, then the method returns to 516 to continue looping through the tree structure. This may allow all the metadata to be analyzed and organized according to parent node and child node relationships included in the metadata. If, at 522, all the metadata is analyzed, then the method proceeds to 524 to generate a database, such as one of the databases of FIGS. 4A and 4B. The method ends.

In some examples, the method 500 may be used to build a sub-tree of a larger tree. In this case, a different "Root" node may be specified and the process of looping through its children remains the same to build the tree. With larger websites, the process may be time-consuming, so only parts of the tree to be changed or having direct dependencies upon other parts may be updated. If a node is updated, it may affect other nodes, parents, siblings, children, etc. In instances where the website is a dynamic website or a client-rendered site is in javascript, for example, the full tree or sub-trees may be rendered in real-time.

The mirrored file system or folder may also be updated by the folder-based content management system. A method 1200 for updating the mirrored file folder is depicted in FIG. 12. At 1202 of the method, the mirrored file folder is scanned to identify the root node and determine locations of parent nodes and child nodes. At 1204, the method includes confirming if changes to the metadata of the nodes and/or to a parent node-child node relationship is detected (excluding the root node). If a change is confirmed, the method proceeds to 1206 to delete the node at which the change is detected and to add a new node to a suitable location in the mirrored file folder, e.g., within the tree structure. If no changes are detected at 1204, however, the method instead continues to 1208 to maintain the current mirrored file folder structure. The method returns to the start.

Turning now to FIGS. 6A and 6B, they show a first template 600 and a second template 650, respectively, for displaying information corresponding to files and/or folders of the folder-based content management system. In one example, the first template 600 is an example of a website template and the second template 650 is an example of a mobile application template. The first template 600 may include a main navigation 602 arranged at a top of the first template 600. The main navigation 602 may correspond to a folder or a sub-folder associated with one or more files. Data from the files may be distributed to various portions of the first template 600, including an asset image section 604, an asset text section 606, a related documents/links section 608, and a sidebar 610. A footer navigation 612 may be located at a bottom of the first template 600. It will be appreciated that the first template 600 and the second template 650 are non-limiting examples of website and mobile application templates and other examples may include variations in an arrangement of the sections of the template without departing from the scope of the present disclosure. For example, different information, such as different assets and/or related pages, may be pulled into the templates to form new components, or variations in rules, language, etc., may be varied in other examples of templates.

In one example, the main navigation 602 may be different than the footer navigation 612, where the information and/or links of the main navigation 602 may be represented by different folders than the information and/or links of the footer navigation 612. In a further example, the different folders of the main navigation 602 and the footer navigation 612 may be filtered and/or customized by a user. Additionally or alternatively, the main navigation 602 may be substantially identical to the footer navigation 612.

The second template 650, which may be adjusted and configured to be viewed through a smaller display device, such as a display device of a mobile device, may include a main navigation 652, an image section 654, a text file section 656, a video section 658, and a secondary navigation 660. Thus, the second template 650 may organize one or more files of the folder/sub-folder differently than the first template 600. In both the first and the second templates 600, 650, the presentation of the front-end of the website is separated from the content of the website using a headless content management system.

In one example, a template database may include a plurality of templates related to a variety of topics. For example, the first and second templates may be related to animals. However, other templates may include other configurations, layouts, sections, and the like for other topics. For example, businesses, sports, finance, environment, and the like may each include corresponding, unique templates. Additionally or alternatively, different topics may be analyzed and fitted into one or more fixed templates, where each of the templates may correspond to subject that includes a variety of topics. For example, a business template may be used for restaurants, retail stores, online shopping, and the like. Custom templates can also be created for specific folders or files, for asset types (images, PDFs, text files), or for folders and files with specific metadata such as timestamps. For example, a file with the name "About Us" could use a special template for the about page on a website. In another example, a home page template can be created and combined with data from various files and folders across the mirrored folder system. Furthermore, the templates may be adjusted according to user input.

As such, a large quantity of content may be efficiently organized into a visual display in a relevant and meaningful manner that is adjustable and customizable according to a particular type of display, and directly accessible from the display. For example, when the same content is displayed in both the first template 600 and the second template 650, the folder-based content management system may automatically adjust the display of the content according to expected differences in display dimensions, aspect ratio, etc. As shown in FIGS. 6A and 6B, the display of sections may be condensed in a display medium with greater size constraints, and the folder-based content management system may be configured to select the most comprehensive files and/or file formats to be presented to the user to provide the user with a comparable level of useful, visual information. A size of each of the displayed sections may also be adjusted based on an amount of data associated with the respective section. A presentation of the sections in the template may therefore indicate a quantity of information corresponding to each of the sections.

Turning now to FIG. 7, it shows an example 700 of a first metadata 710 corresponding to one or more folders and files, and a second metadata 720 corresponding to a set of global settings for rendering a website or a mobile application. In one example, the first metadata 710 may be substantially identical to the metadata of the example 300 of FIG. 3. The first metadata 710 may include data related to a "Name", "Description", "Creation Data", "Modified Date", "Location", "Media Type", "Contents", and "Size". The second metadata 720 may include custom metadata based on a selected theme/template, wherein the selected theme/template is based on the metadata of at least the first metadata 710. The second metadata 720 may include "Theme/Template", "Website Name", "Website URL", "Logo Image", and "Output Settings". A method for selecting a theme/template is described below with respect to FIG. 8. A folder of "Template" files may also be stored in the folder file system database and pulled via a "headless" API in a similar manner as the content.

Turning now to FIG. 8, it shows a method 800 for utilizing a templating engine to select a template and/or a theme for rendering a website or a mobile application GUI based on metadata corresponding to one or more folders and files. The templating engine, e.g., algorithms defining the templating engine, may be included in a folder-based content management system, such as the folder-based content management system 10 of FIG. 1A. The templating engine may be any website or may be stored on a local machine (e.g., a local computing device), and may define a layout of a website. For example, website construction software, which may be separate from synching software, may use the templating engine (comprising any coding language) to obtain data and inject the data into the layout of the website. As an example, the data may be from a structured file database. Further, the templating engine may be used in combination with a search engine, where pages from the Internet may be stored. In some examples, the search engine or and ad service may be constructed via the templating engine, data may be saved and relationships may be rendered. A file system having a tree structure may enable the website or mobile application to be rendered efficiently due to an ease of downloading, syncing, and relocating content of the file system when organized according to the tree structure. The method begins at 802, which includes loading one or more folders, one or more files, and one or more templates. In one example, a processor of a logic subsystem may retrieve the one or more folders, one or more files, and one or more templates from respective databases.

The method proceeds to 804, which includes evaluating the one or more folders and one or more files and their corresponding metadata, which are further used to create a mirror folder data structure. As an example, a processor may evaluate the first metadata 710 of FIG. 7 of the one or more folders and one or more files.

The method proceeds to 806, which includes rendering the one or more folders and one or more files based on the metadata and templates. In one example, graphics may be generated based on media type, classification of the one or more folders and the one or more files, and the like. The mirrored folder structure and its tool set, as described in FIG. 1A, combined with the templating engine are used to render the various parts of the pages, e.g., breadcrumbs, sidebar, main navigation, footer navigation, etc., as depicted in FIGS. 6A and 6B.

The method 800 proceeds to 808, which includes outputting the rendered GUI. In one example, the outputted GUI may be similar to the first template 600 of FIG. 6A or the second template 650 of FIG. 6B, or to a different template.

Turning now to FIG. 9, it shows an example of a rendered GUI 900 output via the method 800 of FIG. 8 based on a file system of a folder-based content management system of one or more folders and one or more files. The rendered GUI 900 may be based on the hierarchical database 400 as illustrated in FIG. 4A.

The three sub-folders, the "Amphibians" sub-folder 412, the "Birds" sub-folder 414, and the "Fish" sub-folder 416, are included in a main navigation 902 of the rendered GUI 900. The third plurality of files 440 corresponding to the "Fish" sub-folder 416 are organized into an image section 904, a video section 906, and a content section 908 of the rendered GUI 900. For example, a file of the third plurality of files 440 labeled "Goldfish" may be rendered into the content section 908. A file labeled "Image" may be rendered into the image section 904 and a file labeled "Video" may be rendered into the video section 906. In one example, a size of the image section 904, the video section 906, and the content section 908 may be based on a corresponding file size, amount of metadata, or other parameter. The rendered GUI 900 also includes a footer navigation 910, which may be similar to the footer navigation 612 of FIG. 6A.

In instances where a dynamic website is configured to pull the information in a "headless" way using a content API, a request and response may be sent for a set of folders or files based on certain criteria. For example, for a navigation element, a request such as "SELECT ALL FOLDERS AT DEPTH 1" applied to just below a root node may be sent. The root node may be a website name of "example.com" at depth 0 and the three sub-folders, "Amphibians" at 412, "Birds" at 414, and "Fish" at 416, are at depth 1 as child nodes below the root node, which may be eventually rendered as a main navigation 902 of the rendered GUI 900.

In one example, various file types may be divided into different sections of the rendered GUI. Additionally or alternatively, some file types may be combined based on data stored in one or more file types. For example, if a document includes description that is related to a video included within a common sub-folder, then the rendered GUI may include where the content of the document is published adjacent to the video. Additionally or alternatively, the content of the document may include a hyperlink, short-cut, or the like, that enables a user to quickly access the video.

Each folder and file in the file system can be transformed into the GUI, which may include, for example, the first and/or the second template of FIGS. 6A-B. The template for a folder may look different from the template for a file or type of file. For example, the GUI for a folder may list out the items in the folder in a grid or list, while the GUI for a file may consist of text content of the file and additionally related files. The transformation of the file system may be selected by the user, depending on what the user wants to display on the page. If a tree data structure is used to represent the file system, then subtrees and filtering can be applied to generate variations of the same tree.

As such, the GUI may include sections that are configured as abbreviated representations of data that are not displayed when the sections are in an un-launched state but can be directly reached from the GIU when launched. For example, in the rendered GUI 900 of FIG. 9, the sections may display information associated with the "Fish" sub-folder 416 due to engagement of a "Fish" heading in the main navigation 902 of the rendered GUI 900. The "Amphibians" and the "Birds" headings of the main navigation 902 may be in un-launched states due to selection, e.g., engagement, of the "Fish" heading by the user. The un-launched headings may therefore represent available data, e.g., abbreviated representations of the data, corresponding to a topic of the heading. The headings may be graphical representations of subsets of data that indicate a subject matter of the subsets of data and, when engaged by the user, may be launched to display the respective subset of data according to the template used. For example, when prompted by the user, the folder-based content management system may retrieve the folders and files from the mirrored file structure corresponding to a selected header to launch and display the data as organized by the sections of the template.

The GUI may be customizable based on the metadata the user decides to store on nodes, for example, of the tree data structure. For example, if a GUI has a sidebar of "recently added", a user may direct the GUI to generate a subtree of "all files with the creation date greater than a week ago". With regards to "linked assets", a user may direct the content management system to add a hyperlink to an image, video, pdf file into the GUI of a file. In another example, the user may direct the content management system to "embed" the asset into the GUI of the file. The content management system is configured with the ability to "insert" a file within another file or a folder within another folder. Each file and folder has a unique identifier or "code" that can be used in another file when referencing a file.

In this way, the content management system can automatically embed images or videos into document files. If an image or video is consequently deleted, the code may no longer be used and the image or video may not be rendered into the respective document. In instances where a file or folder is to be located in multiple places, a shortcut may be created (e.g., an alias of the file) to allow the file to reside in multiple locations on the content management system. In this way, the folder-based content management system may also be a "tagging" or "categorizing" system when folders are used in a manner that simulates a "tag" or "category".

Turning now to FIG. 10, it shows a method 1000 of generating a website based on a file system of a folder-based content management system, as described herein, including the one or more folders and the one or more files. In one example, the method 1000 may be executed via a processor of the logic system of FIG. 1B in combination with the examples of FIGS. 2-9 and 11-12.

The method begins at 1002, which includes loading one or more folders and one or more files into a file system. The one or more folders and one or more files may be loaded based on folders and files provided by a client.

The method proceeds to 1004, to evaluate the one or more folders and the one or more files as well as their metadata for publication of the website. In one example, 1004 may be similar to 504 of method 500.

The method proceeds to 1006 to create a database of relationships for the one or more folders and the one or more files. In one example, root, parent and child nodes may be generated based on the metadata corresponding to each of the one or more folders and the one or more files. As an example, 1006 may be similar to 504 to 524 of method 500 of FIG. 5. At 1008, the method includes loading one or more website settings and/or one or more templates. For example, the website settings may be inputted by a user or retrieved from a database, such as the databases 112 of FIG. 1B. Similarly, the template may be stored at and retrieved from a database.

At 1010, the method includes rendering the one or more folders and the one or more files using metadata, templates, and a templating engine of the folder-based content management system. In one example, 1008 and 1010 of the method 1000 may be similar to the method 800 of FIG. 8 and the rendering process of FIG. 9.

The website and/or a mobile application is published at 1012 of the method. For example, publishing the website and/or the mobile application may include allowing the public to access the website and/or mobile application via the Internet. However, the website and/or the mobile application may be published on various platforms, in other examples. In one example, the published website and/or mobile application includes a GUI, such as the rendered GUI 900 of FIG. 9, that is rendered based on the metadata of the one or more folders and one or more files.

In some examples, in addition to using a folder-based content management system to generate websites, the folder-based content management system may be leveraged to transform existing websites, as well as other infrastructure, into a configuration that can be readily organized and edited. For example, the existing website may be converted into editable elements or assets which may then be re-organized as desired. As such, the folder-based content management system may operate as a website generator, as one example. Strategies for analyzing and converting existing infrastructure, as described further below, may enable efficient and robust methods for restructuring the existing infrastructure into more comprehensive, visually appealing, and user-friendly formats.

Figure 13:
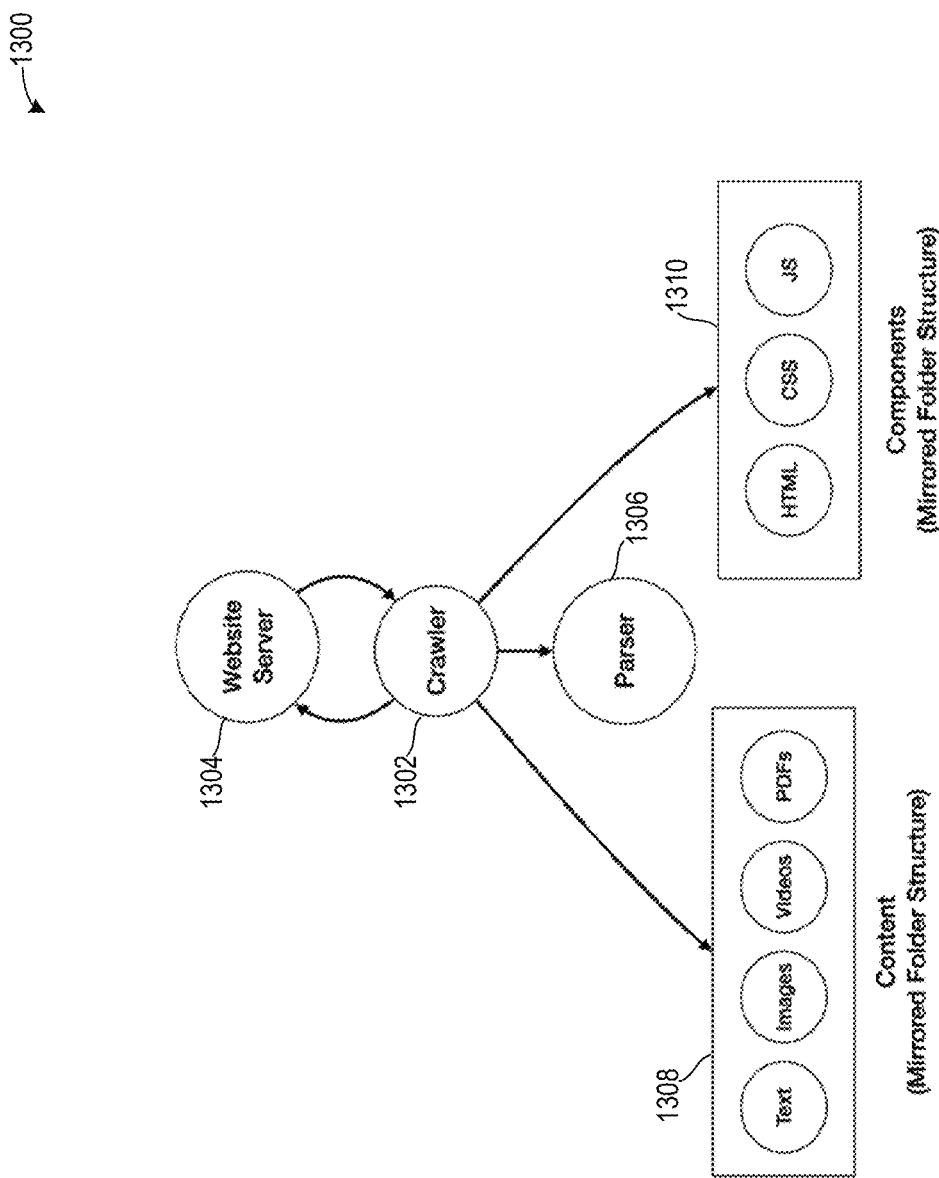
FIG. 13 shows an example process for converting a web page into editable assets, according to an embodiment.

A process 1300 for disassembling an existing infrastructure, such as a website, into editable assets for a folder-based content management system is shown in FIG. 13. Instructions for performing the process 1300 may be stored on memory of a logic subsystem, such as the logic subsystem 103 of FIG. 1B. By breaking up the website into the editable assets, a new infrastructure may be constructed that enables the editable assets to be re-used and customized. The new infrastructure further allows for automatic creation of metadata, for different queries to be applied, for coding to be simplified, for user-friendly aspects of the content management system to be enhanced, as well as other benefits described herein.

Figure 14:
FIG. 14 shows a first example of data stored at a web server which may be extracted by a web crawler of the process of FIG. 13, according to an embodiment.
Figure 15:
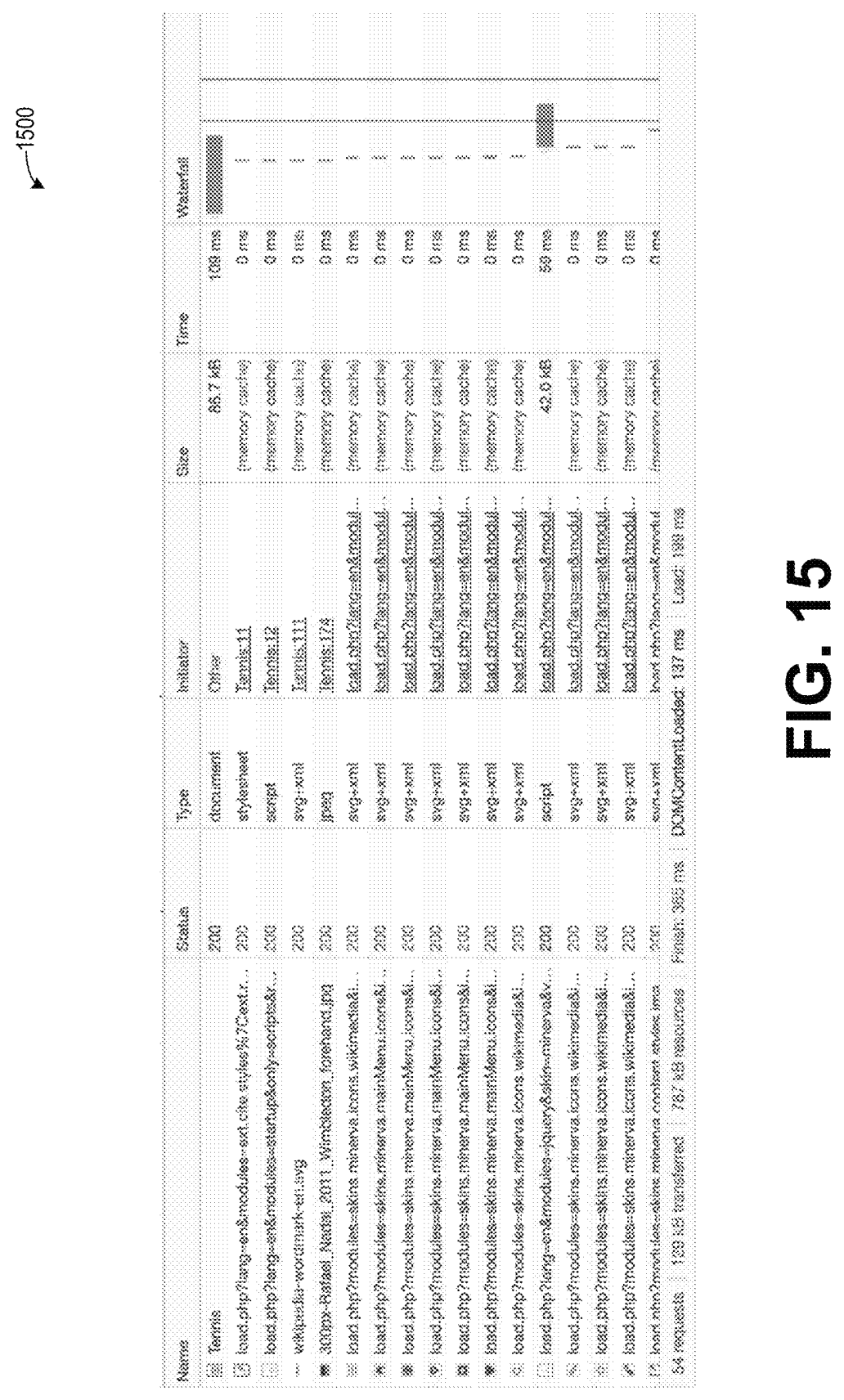

The process 1300 may include employing a web crawler 1302 to crawl the web page. For example, the web crawler 1302 may be hosted at a logic subsystem of a client system, such as the client system 121 of FIG. 1B, and may request data for the web page from a web server 1304, such as the server 101 of FIG. 1B, that is hosting the web page. Examples of data which may be extracted by the web crawler 1302 from the web server 1304 are illustrated in FIGS. 14 and 15 and described further below. Upon receiving the data, the web crawler may send the data to a parser 1306 to separate the data into smaller, unorganized elements, thereby allowing the data to be translated into other languages (e.g., programming languages).

Figure 17:
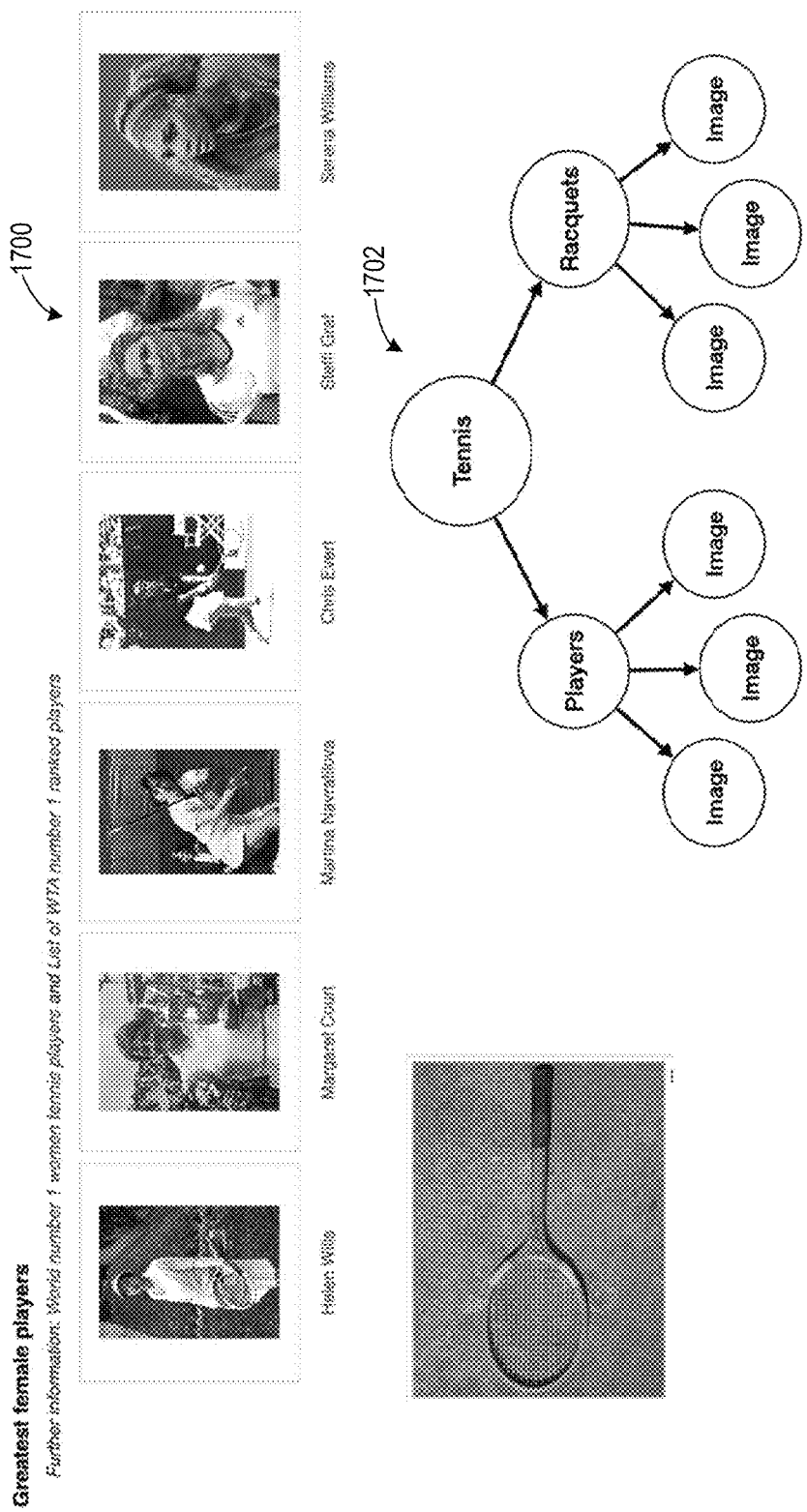
FIG. 17 shows a first example of a tree structure generated based on extracted data which may be used to create a mirrored folder structure, according to an embodiment.
Figure 18:
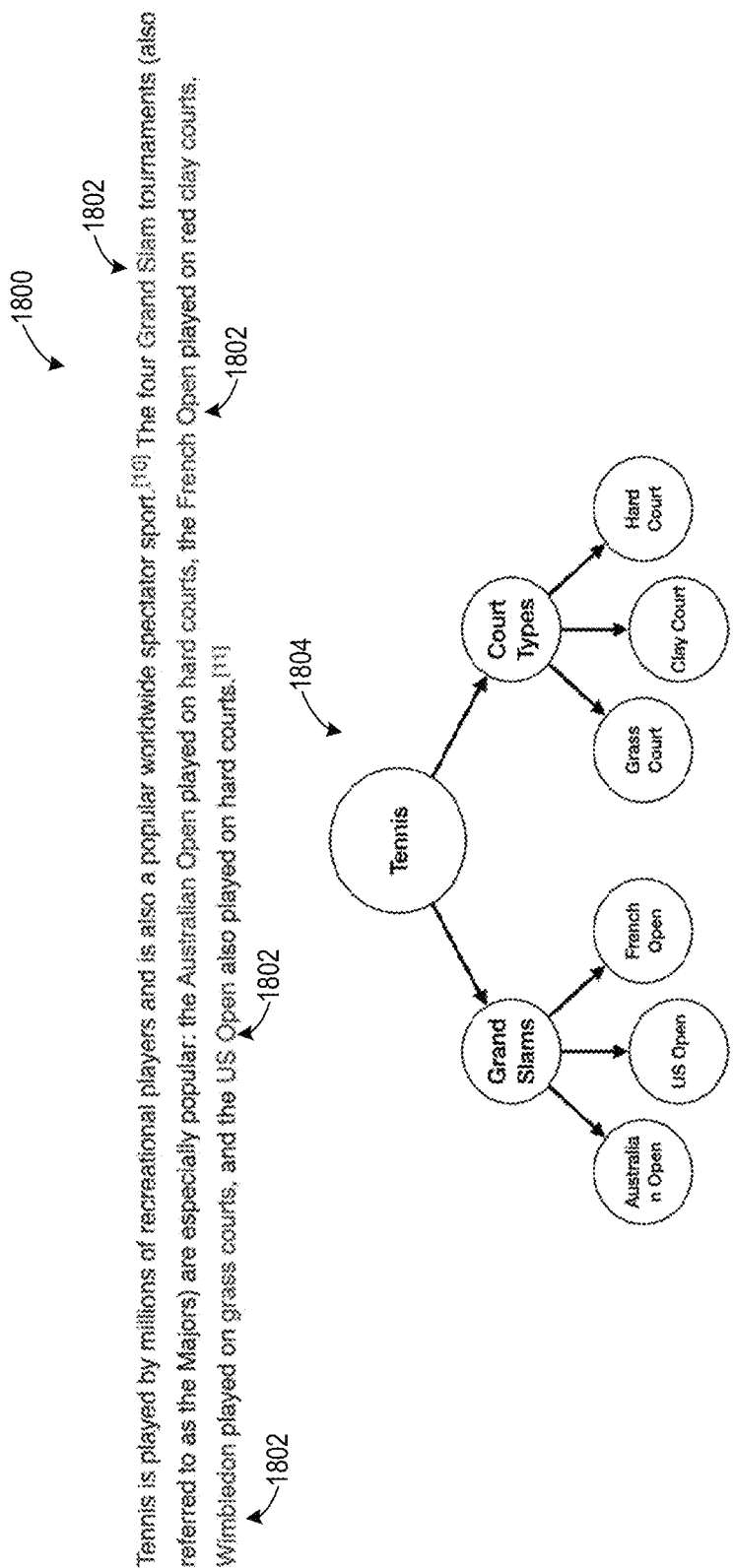
FIG. 18 shows a second example of a tree structure generated based on extracted data which may be used to create a mirrored folder structure, according to an embodiment.

The unorganized parsed data may be organized and arranged into a first mirrored folder structure 1308, based on identified content, and/or a second mirrored folder structure 1310, based on identified components, the content and/or components identified within the parsed data. In one example, artificial intelligence and/or machine learning algorithms may be employed to organize the parsed data received from the web crawler 1302, which has been extracted as editable assets, into the mirrored folder structures. As an example, artificial intelligence and/or machine learning models may be trained to organize the parsed data according to type of asset based on learned relationships between the asset types. As such the parsed data may be sorted and rearranged in a meaningful, comprehensive manner. For example, the first mirrored folder structure 1308 may be organized according to content such as text, images, videos, PDFs, etc. while the second mirrored folder structure 1310 may be organized according to components of the data, e.g., programming languages used to present the data such HTML, CSS, JS, etc. Examples of the first mirrored folder structure 1308 are depicted in FIGS. 17 and 18, and described further below.

Turning now to FIG. 14, a first example of a set of files 1400 provided by a web server is shown. The set of files 1400 includes HTML files, image files, CSS files, JS files, etc., and may provide data specific to a web page that is stored at the web server, e.g., the web server 1304 of FIG. 13. The web crawler, e.g., the web crawler 1302 of FIG. 13, may extract data from the set of files 1400 to allow a mirrored folder structure to be generated based on the extracted data. Similarly, a second example of a set of files 1500 is shown in FIG. 15, which may also be provided by the web server and crawled by the web crawler to acquire data for constructing a mirrored folder structure. The set of files 1500 includes various file types, such as jpeg, SVG+XML, documents, stylesheets, and scripts.

Figure 16:
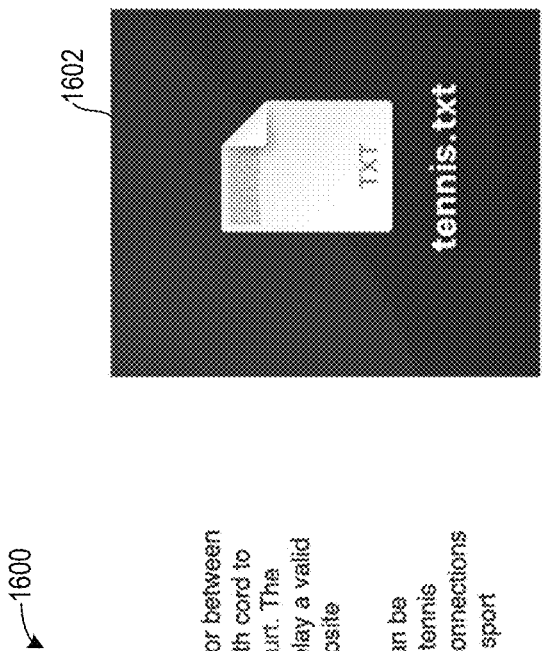
FIG. 16 shows an example of text-based extraction of data from a web page, according to an embodiment.

In some examples, the web crawler may extract data according to file type, which may be compiled to generate a new file to be stored in a mirrored folder structure. For example, a web page 1600 is shown in FIG. 16. Although data pertaining to the web page 1600 may include various types of files, such as hyperlinks and images (not shown), only text is extracted from the data by the web crawler. The extracted text data may be stored in a new file 1602, e.g., as a .txt file.

As described above, with reference to FIG. 13, the data extracted by the web crawler and parsed by the parser, may be assembled into a mirrored folder structure based on content. For example, as shown in FIG. 17, a plurality of images 1700 may be extracted from a web page and arranged in a tree structure 1702 of the mirrored folder structure to organize the plurality of images 1700 in a hierarchical manner, as described above with respect to FIGS. 4A-4B. Nodes of the tree structure 1702, e.g., a root node, parent nodes, child nodes, may be identified from the data.

As another example of mirrored folder structure generation based on content, extracted and parsed data may be sorted according to hyperlinks of an HTML web page, as shown in FIG. 18. The web page includes HTML text 1800 in which hyperlinks 1802 may be embedded. A tree structure 1804 of a mirrored folder structure may be created based on the hyperlinks identified in the data, including various node types.

Figure 19:
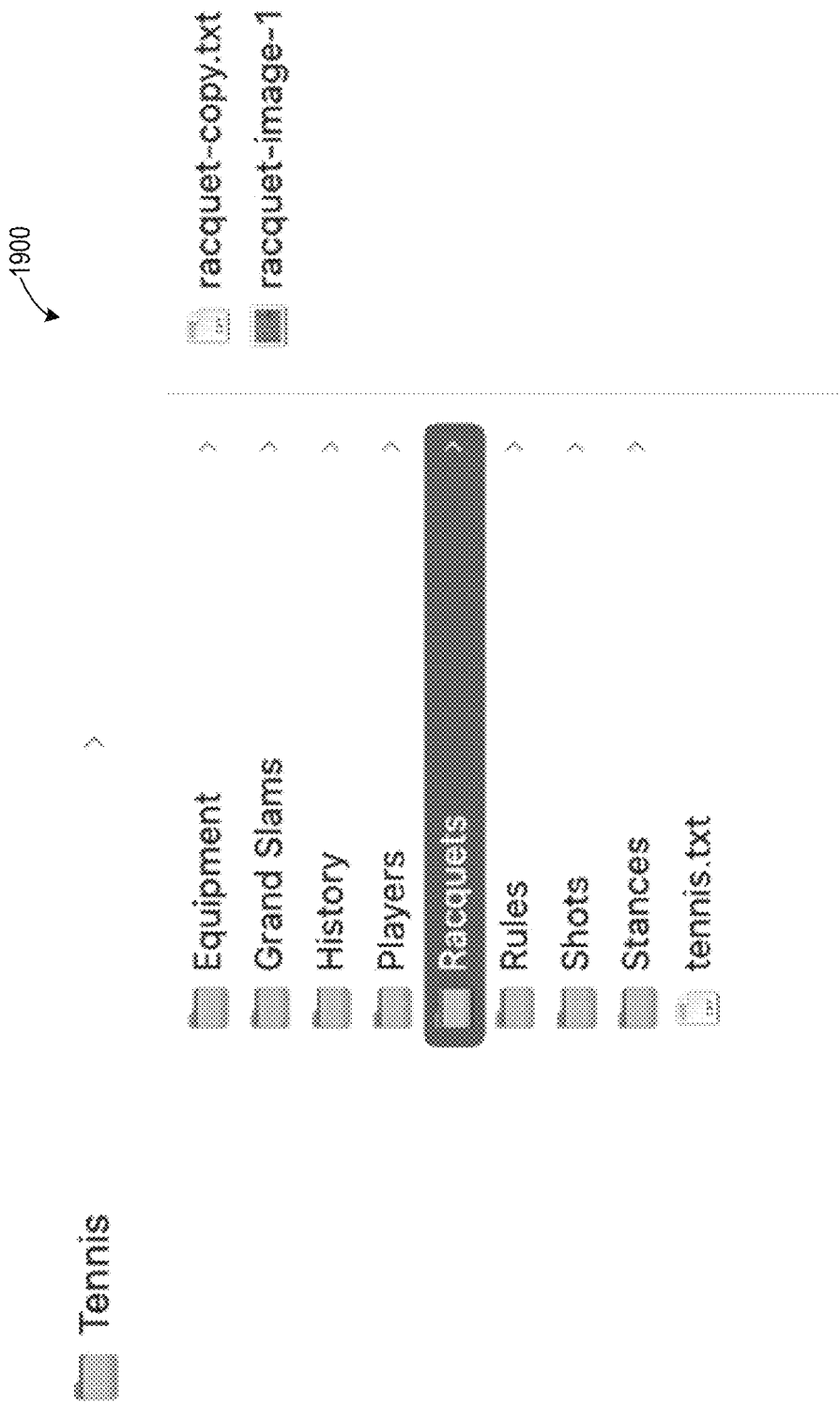
FIG. 19 shows an example of a mirrored folder file system displayed to a user based on the process of FIG. 13, according to an embodiment.
Figure 20:
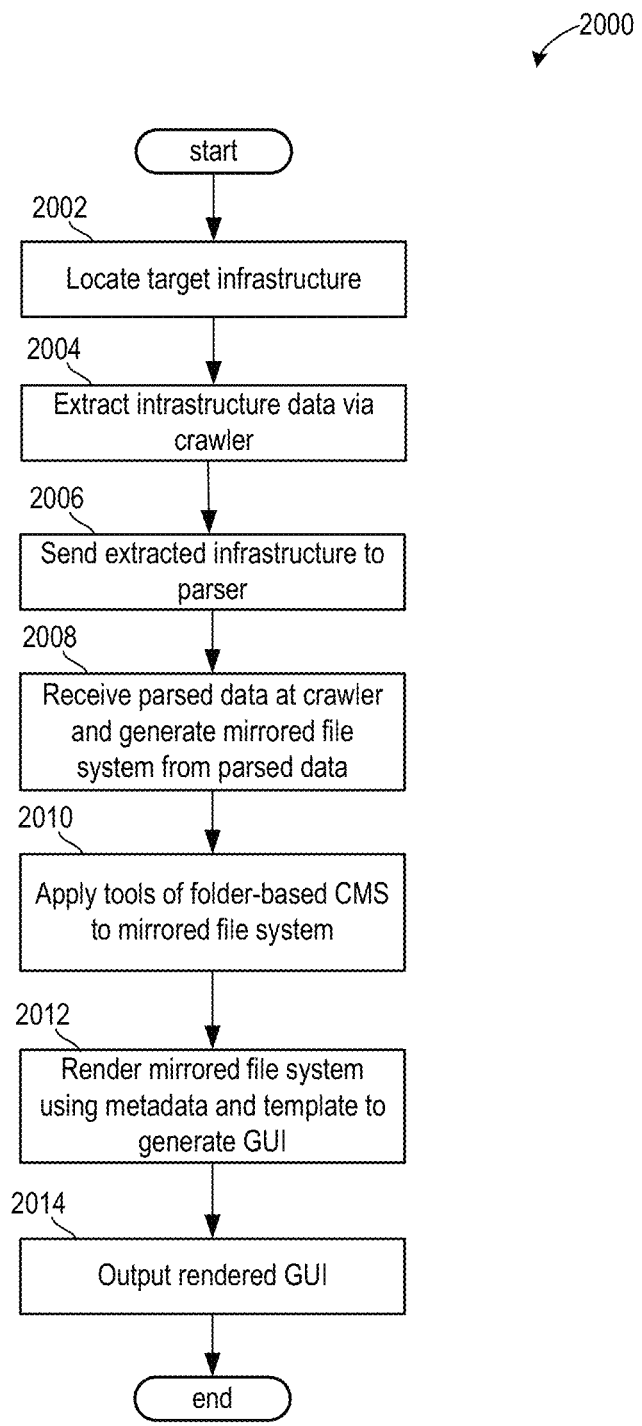
FIG. 20 shows an example of a method for generating a new infrastructure from a mirrored folder file system generated based on an existing infrastructure, according to an embodiment.

The tree structure 1804 of FIG. 18, generated based on the extracted and parsed data, may be used to create an optimized, headless content management system that, as illustrated in FIG. 19, may be displayed to a user as a mirrored folder file system 1900. The displayed mirrored folder file system 1900 may be modified, recombined, etc., as desired by the user. Furthermore, in some examples, additional mirrored folder file systems may be produced for each presentation type, e.g., HTML, CSS, JS, etc., or for the website by creating file-based components which may be edited by a user. In addition, the mirrored folder file system 1900 may be updated automatically, as described above.

A method 2000 is depicted in FIG. 20 for converting an existing, first infrastructure, such as a server or a website, into a second, new infrastructure using a folder-based content management system. The method may be executed by a processor of a logic system, such as the logic subsystem 123 of the client system 121 of FIG. 1B, according to the process 1300 of FIG. 13 and elaborated below, with respect to the method 2000.

At 2002, the method includes locating the first, existing infrastructure as a target infrastructure. In one example, the target infrastructure may be a website. The website may be located and identified by a user's navigation thereto, for example.

At 2004, the method includes extracting data, e.g., raw data, including metadata, associated with the target infrastructure using a web crawler. The web crawler may, for example, request the data from a host of the website, such as a server (e.g., the server 101 of FIG. 1B) or a system. The requested data may be extracted from the host and directed to a parser at 2006, which may parse the data into smaller elements, or segments. As described above, the data may be parsed according to content, such as file type, and/or components, such as programming language type, to form distinct sets of parsed data. Upon receiving the sets of parsed data at the web crawler from the parser, a mirrored file system, which may have a folder-based structure, may be created at 2008, where the mirrored file system may incorporate each set of parsed data. For example, the mirrored file system may be generated using machine learning and/or artificial intelligence where the sets of parsed data may be sorted and organized accordingly. The sets of parsed data are thereby converted, e.g., recombined, into a new format according to the mirrored file system. For example, the parsed data may be organized and sorted into the mirrored file system based on the metadata. The mirrored file system may mirror the data corresponding to the target infrastructure that is stored at the host.

At 2010, the method includes applying tools of the folder-based content management system to configure and optimize the mirrored file system. For example, the tools described above with respect to FIG. 1A may be used, including one or more of a folder-based URL tool, a related pages tool, a breadcrumb tool, a redirect tool, a search tool, and a no code tool. Within the related pages tool, a content creation tool and/or recommendation engine or tool may be generated to provide recommendations for additional related or like assets for a folder of the mirrored file system.

In one example, the sets of parsed data, along with the additional related or like assets, may be organized to optimize the mirrored file system data for searching by a search engine. For example, machine learning and/or artificial intelligence algorithms may be employed to arranged the parsed data and additional related or like assets such that keywords relevant to and indicative of subject matter of the parsed data to be readily identified by the search engine. For example, by arranging the parsed data in a hierarchical data structure, such as the hierarchical database 400 of FIG. 4A, the folder-based URL tool may generate URLs that may be easily recognized by the search engine.

At 2012, the method includes rendering the mirrored folder structures from the sets of parsed data to generate a GUI. For example, as described above with reference to FIGS. 8 and 1010 of FIG. 10, the mirrored folder structures may be loaded and evaluated by the folder-based content management system. Evaluating the mirrored folder structures may include analyzing the metadata of the mirrored folder structures and using the metadata to determine arrangement of the parsed data into a template for displaying the data of the mirrored folder structures. For example, the template may be either of the templates of FIGS. 6A and 6B. The template may be output as the rendered GUI at 2014, by publishing the rendered GUI at a new infrastructure, such as a new website, on a platform, which may be of various types. For example, the GUI may be displayed at a display screen of a computing device, a mobile device, etc., to a user to enable interaction of the user with the data represented by the GUI.

In this way, an already existing infrastructure may be deconstructed into assets and reorganized into a new infrastructure via a folder-based content management system. The folder-based content management systems may allow the existing infrastructure to be crawled and parsed into editable elements, which may be organized along with metadata into mirrored folder structures. By converting the infrastructure data into the mirrored folder structures, the infrastructure data may be readily identified, rearranged, and displayed in the new infrastructure without demanding a high computing burden or incurring loss of data and dependencies. Further, components of the existing infrastructure data, such as file types, programming language types, etc., may be preserved in the new infrastructure displayed to the user in a GUI rendered based on the metadata and a customizable template.

It will be appreciated that the folder-based content management system described herein may be used for a variety of applications in addition to website generation and updating. For example, the system may be used for an ad server with an asset folder of ad files (such as images, figures, tables, graphs, movies, etc.) to organize the ad files by file type or by campaign. In another example, an image server with digital assets including a folder of images may rely on the system, with additional logic, to enable conversion of file size and/or file dimensions, to apply colors and/or filters, etc., of the images. In yet another example, the folder-based content management system may be applied to digital content to publish the digital content to different platforms, such as social media, separate websites, etc. The examples provided herein are non-limiting examples, and numerous additional applications are possible.

The technical effect of automatically publishing a website based on metadata of one or more folders and one or more files provided by a user without further user input is to increase an efficiency and simplicity of publishing the website through analysis of the metadata and transformation of the website data in a manner that allows asset type to be readily identified. By organizing the assets provided by the user into a file system, the website generator may analyze metadata of the folders and files, and organize the folders and files into an organized database that is easily understood by the user. Loss of data due to poor tracking of the data is minimized, therefore allowing the website to be published faster and with reduced errors. A template along with one or more website settings may be generated based on the organized database, which may further generate a rendered GUI, publishable to a website. The template may be customized by the user without demanding time-consuming retrieval and rearrangement of the website data. Overall, the process for publishing the website may be less computing-intensive and less demanding of advanced user knowledge of data manipulation for website publishing. In this way, a large amount of information may be organized and converted into an easy-to-follow and aesthetically pleasing website that is generated automatically with minimal user input.

A further technical effect resulting from conversion of an already existing website into editable assets is that the already existing website may be reconfigured into a new website or other content outputs without demanding other content output, other mediums for consumption thereof, or time-consuming and energy-intensive effort by the user. By extracting assets from the already existing website and organizing the extracted assets into an organized structure, such as a mirrored file folder system, based on metadata of the extracted assets, the assets may be used to construct a new website in an efficient, automated manner. Data from the already existing website is thereby retrieved and not lost, reducing an amount of time and energy demanded for replicating information provided by the already existing website to display in the new website. A computing burden may be reduced and processing of the website data may be streamlined with a minimal demand for user input.

The disclosure also provides support for a method executed via a processor based on instructions stored on non-transitory memory of the processor, the method comprising: converting an existing infrastructure into editable assets, organizing the editable assets into a structure of a folder file system by recombining the editable assets into a new format, and rendering the folder file system with the new format as a graphical user interface (GUI). In a first example of the method, converting the existing infrastructure includes crawling an existing website and converting web pages of the website into the editable assets. In a second example of the method, optionally including the first example, organizing the editable assets into the structure of the folder file system includes organizing the editable assets into a tree structure and further includes identifying a root node from the editable assets and defining parent and/or child nodes under the root node. In a third example of the method, optionally including one or both of the first and second examples, organizing the editable assets includes utilizing artificial intelligence and/or machine learning algorithms to organize parsed data extracted as the editable assets. In a fourth example of the method, optionally including one or more or each of the first through third examples, converting the existing infrastructure includes converting a website's server response into raw data and recombining the raw data into the new format. In a fifth example of the method, optionally including one or more or each of the first through fourth examples, organizing the editable assets includes using one of artificial intelligence or machine learning to organize the editable assets. In a sixth example of the method, optionally including one or more or each of the first through fifth examples, organizing the editable assets into the structure of the folder file system enables searching to be optimized. In a seventh example of the method, optionally including one or more or each of the first through sixth examples, converting the existing infrastructure includes converting an ad server with an asset folder of ad files and organizing the ad files by file type and/or by campaign. In a eighth example of the method, optionally including one or more or each of the first through seventh examples, converting the existing infrastructure includes converting an image server with digital assets. In a ninth example of the method, optionally including one or more or each of the first through eighth examples, the method further comprises: publishing the organized editable assets to different platforms. In a tenth example of the method, optionally including one or more or each of the first through ninth examples, organizing the editable assets into the structure of the folder file system includes organizing parsed data based on one or more of content and components. In a eleventh example of the method, optionally including one or more or each of the first through tenth examples, organizing the parsed data based on content includes organizing the parsed data according to identification of text, image, video, and pdf files, and wherein organizing the parsed data based on components includes organizing the parsed data according to programming languages of the parsed data, the programming languages including HTML, CSS, and JS.

The disclosure also provides support for a method executed via a processor based on instructions stored on non-transitory memory of the processor, the method, comprising: converting parsed data extracted from an existing infrastructure into a hierarchical data structure to generate a file system, recommending additional related or like assets for a folder of the file system from other folders of the file system and incorporating the additional related or like assets into the folder, and publishing the file system with the incorporated additional related or like assets at a graphical user interface of a platform. In a first example of the method, recommending the additional related or like assets includes creating a content creation tool or a recommendation engine to provide recommendations of new files to add to the file system.

The disclosure also provides support for a system for generating a website comprising: a server in communication with a client system via a network, and a logic subsystem including one or more processors with instructions stored on non-transitory memory thereof that when executed cause the one or more processors to: retrieve data for an existing website from the server, parse the data into unorganized editable assets, organize the unorganized editable assets into a file system to optimize a structure of the file system for searching, publish file system as a new website. In a first example of the system, a search tool is used to generate relevant metadata for search engine optimization, and wherein the search tool includes an exporter tool for backing up the file system for transfer and exporting the file system in an exportable format. In a second example of the system, optionally including the first example, employing the search tool includes using a multi lingual tool for handling content in multiple languages and using a recommendation tool for offering suggestions for missing assets files and assets. In a third example of the system, optionally including one or both of the first and second examples, when the editable assets are organized into the file system, the editable assets are converted to common data structures used by other file systems. In a fourth example of the system, optionally including one or more or each of the first through third examples, the file system is displayed to the user as an optimized, headless content management system, and wherein the graphical user interface is a front-end of the optimized, headless content management system. In a fifth example of the system, optionally including one or more or each of the first through fourth examples, the file system is constructed based on sorting of the editable assets according to hyperlinks of the existing website.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the systems described above with respect to FIG. 1. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and preceded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method executed via a processor based on instructions stored on non-transitory memory of the processor, the method comprising:
converting an existing infrastructure into editable assets;
organizing the editable assets into a structure of a folder file system based on content of the editable assets by recombining the editable assets into a new format; and
rendering the folder file system with the new format as a graphical user interface (GUI).

2. The method of claim 1, wherein converting the existing infrastructure includes crawling an existing website and converting web pages of the website into the editable assets.

3. The method of claim 1, wherein organizing the editable assets into the structure of the folder file system includes organizing the editable assets into a tree structure and further includes identifying a root node from the editable assets and defining parent and/or child nodes under the root node.

4. The method of claim 1, wherein organizing the editable assets includes utilizing artificial intelligence and/or machine learning algorithms to organize parsed data extracted as the editable assets.

5. The method of claim 1, wherein converting the existing infrastructure includes converting a website's server response into raw data and recombining the raw data into the new format.

6. The method of claim 1, wherein organizing the editable assets includes using one of artificial intelligence or machine learning to organize the editable assets.

7. The method of claim 1, wherein organizing the editable assets into the structure of the folder file system enables searching to be optimized.

8. The method of claim 1, wherein converting the existing infrastructure includes converting an ad server with an asset folder of ad files and organizing the ad files by file type and/or by campaign.

9. The method of claim 1, wherein converting the existing infrastructure includes converting an image server with digital assets.

10. The method of claim 1, further comprising publishing the organized editable assets to different platforms.

11. The method of claim 1, wherein organizing the editable assets into the structure of the folder file system includes organizing parsed data based on one or more of content and components.

12. The method of claim 11, wherein organizing the parsed data based on content includes organizing the parsed data according to identification of text, image, video, and pdf files, and wherein organizing the parsed data based on components includes organizing the parsed data according to programming languages of the parsed data, the programming languages including HTML, CSS, and JS.

13. A method executed via a processor based on instructions stored on non-transitory memory of the processor, the method comprising:
converting parsed data extracted from an existing infrastructure into a hierarchical data structure to generate a file system;
organizing the parsed data based on one or more of content and components, wherein organizing based on content includes organizing the parsed data according to identification of text, image, video, and pdf files, and wherein organizing the parsed data based on components includes organizing the parsed data according to programming languages of the parsed data, the programming languages including HTML, CSS, and JS;
recommending additional related or like assets for a folder of the file system from other folders of the file system and incorporating the additional related or like assets into the folder; and
publishing the file system with the incorporated additional related or like assets at a graphical user interface of a platform.

14. The method of claim 13, wherein recommending the additional related or like assets includes creating a content creation tool or a recommendation engine to provide recommendations of new files to add to the file system.

15. A system for generating a website, comprising:
a server in communication with a client system via a network; and
a logic subsystem including one or more processors with instructions stored on non-transitory memory thereof that when executed cause the one or more processors to:
retrieve data for an existing website from the server;
parse the data into unorganized editable assets;
organize the unorganized editable assets into a file system to optimize a structure of the file system for searching, wherein a search tool is used to generate relevant metadata for search engine optimization, and wherein the search tool includes an exporter tool for backing up the file system for transfer and exporting the file system in an exportable format; and
publish the file system as a new website.

16. The method of claim 15, wherein employing the search tool includes using a multi-lingual tool for handling content in multiple languages and using a recommendation tool for offering suggestions for missing assets files and assets.

17. The system of claim 16, wherein when the editable assets are organized into the file system, the editable assets are converted to common data structures used by other file systems.

18. The system of claim 16, wherein the file system is displayed to the user as an optimized, headless content management system, and wherein the graphical user interface is a front-end of the optimized, headless content management system.

19. The system of claim 16, wherein the file system is constructed based on sorting of the editable assets according to hyperlinks of the existing website.

* * * * *